(12) United States Patent
Conrad

(10) Patent No.: US 12,396,604 B2
(45) Date of Patent: Aug. 26, 2025

(54) CONFIGURATION OF A CYCLONE ASSEMBLY AND SURFACE CLEANING APPARATUS HAVING SAME

(71) Applicant: Omachron Intellectual Property Inc., Hampton (CA)

(72) Inventor: Wayne Ernest Conrad, Hampton (CA)

(73) Assignee: Omachron Intellectual Property Inc., Hampton (CA)

(*) Notice: Subject to any disclaimer, the term of this patent is extended or adjusted under 35 U.S.C. 154(b) by 218 days.

(21) Appl. No.: 18/076,883

(22) Filed: Dec. 7, 2022

(65) Prior Publication Data
US 2023/0165422 A1 Jun. 1, 2023

Related U.S. Application Data

(60) Continuation of application No. 16/377,778, filed on Apr. 8, 2019, now Pat. No. 11,547,259, which is a
(Continued)

(51) Int. Cl.
*A47L 9/16* (2006.01)
*B04C 5/187* (2006.01)
(Continued)

(52) U.S. Cl.
CPC ........... *A47L 9/1608* (2013.01); *A47L 9/1658* (2013.01); *A47L 9/1683* (2013.01); *B04C 5/187* (2013.01); *A47L 9/1625* (2013.01); *A47L 9/1633* (2013.01); *A47L 9/1641* (2013.01); *A47L 9/165* (2013.01); *B01D 45/16* (2013.01); *B04C 5/04* (2013.01); *B04C 5/103* (2013.01); *B04C 5/14* (2013.01);
(Continued)

(58) Field of Classification Search
CPC .... A47L 9/1608; A47L 9/1658; A47L 9/1683; A47L 9/165
See application file for complete search history.

(56) References Cited

U.S. PATENT DOCUMENTS 1,779,761 A 10/1930 Alford, Sr.
4,373,228 A * 2/1983 Dyson ...................... A47L 5/32
15/352
(Continued)

FOREIGN PATENT DOCUMENTS

CA 1077412 A1 5/1980
CA 2275675 A1 12/1999
(Continued)

OTHER PUBLICATIONS

English machine translation of KR1020080039105, published on May 7, 2008.
(Continued)

*Primary Examiner* — Bryan R Muller
(74) *Attorney, Agent, or Firm* — Philip C. Mendes da Costa; SMART & BIGGAR LP

(57) ABSTRACT

A cyclone separator useable in a surface cleaning apparatus comprises a cyclone chamber and a dirt collection chamber exterior to, and surrounding at least a portion of the cyclone chamber. The dirt collection chamber is in communication with the cyclone chamber via a dirt outlet. An air flow passage extending to the cyclone air inlet travels generally axially through the dirt collection chamber.

18 Claims, 24 Drawing Sheets

Related U.S. Application Data continuation of application No. 14/529,027, filed on Oct. 30, 2014, now Pat. No. 10,327,612, which is a continuation of application No. 13/763,477, filed on Feb. 8, 2013, now Pat. No. 8,898,857, which is a division of application No. 12/338,022, filed on Dec. 18, 2008, now abandoned.

(60) Provisional application No. 61/014,983, filed on Dec. 19, 2007.

(51) Int. Cl.
  *B01D 45/16* (2006.01)
  *B04C 5/04* (2006.01)
  *B04C 5/103* (2006.01)
  *B04C 5/14* (2006.01)
  *B04C 5/26* (2006.01)
  *B04C 5/28* (2006.01)

(52) U.S. Cl.
  CPC .................. *B04C 5/26* (2013.01); *B04C 5/28* (2013.01); *Y10S 55/03* (2013.01)

(56) References Cited

U.S. PATENT DOCUMENTS

| | | |
|---|---|---|
| 4,790,865 A | 12/1988 | Demarco |
| 5,139,652 A | 8/1992 | Leblanc |
| 5,267,371 A | 12/1993 | Soler et al. |
| 5,358,290 A | 10/1994 | Fleet et al. |
| 5,391,051 A | 2/1995 | Sabatier et al. |
| 5,681,450 A | 10/1997 | Chitnis et al. |
| 5,922,093 A | 7/1999 | James et al. |
| 5,974,625 A | 11/1999 | Garner |
| 6,098,244 A | 8/2000 | Conrad et al. |
| 6,099,661 A | 8/2000 | Conrad |
| 6,101,672 A | 8/2000 | Conrad et al. |
| 6,123,779 A | 9/2000 | Conrad et al. |
| 6,129,775 A | 10/2000 | Conrad et al. |
| 6,135,708 A | 10/2000 | Conrad et al. |
| 6,168,716 B1 | 1/2001 | Conrad et al. |
| 6,170,119 B1 | 1/2001 | Conrad et al. |
| 6,171,356 B1 | 1/2001 | Twerdun |
| 6,173,474 B1 | 1/2001 | Conrad |
| 6,174,127 B1 | 1/2001 | Conrad et al. |
| 6,183,641 B1 | 2/2001 | Conrad et al. |
| 6,224,325 B1 | 5/2001 | Conrad et al. |
| 6,231,645 B1 | 5/2001 | Conrad et al. |
| 6,238,177 B1 | 5/2001 | Conrad et al. |
| 6,243,917 B1 | 6/2001 | Conrad |
| 6,251,296 B1 | 6/2001 | Conrad et al. |
| 6,261,052 B1 | 7/2001 | Conrad et al. |
| 6,261,379 B1 | 7/2001 | Conrad et al. |
| 6,280,143 B1 | 8/2001 | Parker et al. |
| 6,307,358 B1 | 10/2001 | Conrad |
| 6,312,594 B1 | 11/2001 | Conrad et al. |
| 6,328,527 B1 | 12/2001 | Conrad et al. |
| 6,334,234 B1 | 1/2002 | Conrad et al. |
| 6,344,064 B1 | 2/2002 | Conrad |
| 6,398,834 B2 | 6/2002 | Oh |
| 6,406,505 B1 | 6/2002 | Oh et al. |
| 6,432,154 B2 | 8/2002 | Oh et al. |
| 6,440,197 B1 | 8/2002 | Conrad et al. |
| 6,457,205 B1 | 10/2002 | Conrad |
| 6,532,620 B2 | 3/2003 | Oh |
| 6,533,834 B2 | 3/2003 | Conrad et al. |
| 6,599,340 B2 | 7/2003 | Conrad et al. |
| 6,706,095 B2 | 3/2004 | Morgan |
| 6,782,585 B1 | 8/2004 | Conrad et al. |
| 6,810,558 B2 * | 11/2004 | Lee ................... A47L 9/1658 55/459.3 |
| 6,868,578 B1 | 3/2005 | Kasper et al. |
| 7,065,826 B1 | 6/2006 | Arnold |
| 7,086,119 B2 | 8/2006 | Go et al. |
| 7,160,346 B2 | 1/2007 | Park |
| 7,329,294 B2 | 2/2008 | Conrad |
| 7,419,521 B2 | 9/2008 | Oh et al. |
| 7,422,615 B2 * | 9/2008 | Kim ................... A47L 9/1683 55/459.1 |
| 7,511,224 B1 | 3/2009 | Kossak |
| 7,544,224 B2 | 6/2009 | Tanner et al. |
| 7,547,351 B2 * | 6/2009 | Oh .................... B01D 45/16 95/271 |
| 7,618,470 B2 | 11/2009 | Eddington et al. |
| 7,645,309 B2 | 1/2010 | Jeong et al. |
| 7,736,408 B2 | 6/2010 | Bck et al. |
| 7,740,675 B2 | 6/2010 | Conrad |
| 7,744,667 B2 | 6/2010 | Oh et al. |
| 7,749,293 B2 | 7/2010 | Conrad |
| 7,776,120 B2 | 8/2010 | Conrad |
| 7,803,207 B2 | 9/2010 | Conrad |
| 7,811,345 B2 | 10/2010 | Conrad |
| 7,867,308 B2 | 1/2011 | Conrad |
| 7,887,612 B2 | 2/2011 | Conrad |
| 7,941,895 B2 | 5/2011 | Conrad |
| 8,034,140 B2 | 10/2011 | Conrad |
| 8,127,398 B2 | 3/2012 | Conrad |
| 8,146,201 B2 | 4/2012 | Conrad |
| 8,151,407 B2 | 4/2012 | Conrad |
| 8,176,596 B2 | 5/2012 | Conrad |
| 8,292,979 B2 | 10/2012 | Conrad |
| 8,349,428 B2 | 1/2013 | Conrad |
| 8,590,102 B2 | 11/2013 | Conrad |
| 8,621,709 B2 | 1/2014 | Conrad |
| 8,677,558 B2 | 3/2014 | Conrad |
| 8,713,751 B2 | 5/2014 | Conrad |
| 8,869,344 B2 | 10/2014 | Conrad |
| 9,119,513 B2 | 9/2015 | Conrad |
| 10,537,219 B2 | 1/2020 | Conrad et al. |
| 11,793,374 B2 | 10/2023 | Conrad |
| 11,857,142 B2 | 1/2024 | Conrad |
| 2001/0027587 A1 | 10/2001 | Conrad et al. |
| 2002/0020154 A1 | 2/2002 | Yang |
| 2002/0124538 A1 | 9/2002 | Oh et al. |
| 2002/0134059 A1 | 9/2002 | Oh |
| 2002/0162188 A1 | 11/2002 | Harmen |
| 2003/0201754 A1 | 10/2003 | Conrad |
| 2004/0060146 A1 | 4/2004 | Coates et al. |
| 2004/0216266 A1 | 11/2004 | Conrad |
| 2005/0138763 A1 | 6/2005 | Tanner et al. |
| 2006/0137304 A1 | 6/2006 | Jeong et al. |
| 2006/0196004 A1 | 9/2006 | Conrad |
| 2007/0084160 A1 * | 4/2007 | Kim ................... A47L 9/1625 55/345 |
| 2007/0084161 A1 | 4/2007 | Yoo |
| 2007/0209339 A1 | 9/2007 | Conrad |
| 2007/0262512 A1 | 11/2007 | Watanabe et al. |
| 2007/0289267 A1 | 12/2007 | Makarov et al. |
| 2008/0172992 A1 | 7/2008 | Conrad |
| 2008/0172995 A1 | 7/2008 | Conrad |
| 2008/0178416 A1 | 7/2008 | Conrad |
| 2008/0178418 A1 | 7/2008 | Conrad |
| 2008/0179133 A1 | 7/2008 | Tanrad |
| 2008/0184681 A1 | 8/2008 | Oh et al. |
| 2008/0190080 A1 | 8/2008 | Oh et al. |
| 2008/0196366 A1 | 8/2008 | Conrad |
| 2008/0216281 A1 | 9/2008 | Conrad |
| 2009/0181841 A1 | 7/2009 | Conrad |
| 2009/0205161 A1 | 8/2009 | Conrad |
| 2009/0209403 A1 | 8/2009 | Conrad |
| 2011/0219570 A1 | 9/2011 | Conrad |
| 2013/0145575 A1 | 6/2013 | Conrad |
| 2014/0237768 A1 | 8/2014 | Conrad |
| 2016/0367094 A1 | 12/2016 | Conrad |

FOREIGN PATENT DOCUMENTS

| | | |
|---|---|---|
| CA | 2288544 A1 | 5/2000 |
| CA | 2258416 A1 | 7/2000 |
| CA | 2258419 A1 | 7/2000 |
| CA | 2258421 A1 | 7/2000 |
| CA | 2258422 A1 | 7/2000 |
| CA | 2258423 A1 | 7/2000 |

(56) References Cited

FOREIGN PATENT DOCUMENTS

| | | |
|---|---|---|
| CA | 2258426 A1 | 7/2000 |
| CA | 2330801 A1 | 7/2001 |
| CA | 2338193 A1 | 7/2002 |
| CA | 2339514 A1 | 9/2002 |
| CA | 2342673 A1 | 9/2002 |
| CA | 2342993 A1 | 9/2002 |
| CA | 2438079 A1 | 9/2002 |
| CN | 1493244 A | 5/2004 |
| CN | 1875846 A | 12/2006 |
| CN | 1875855 A | 12/2006 |
| CN | 1887437 A | 1/2007 |
| CN | 100998484 A | 7/2007 |
| CN | 101015436 A | 8/2007 |
| CN | 101108111 A | 8/2007 |
| CN | 101061932 A | 10/2007 |
| CN | 101073480 A | 11/2007 |
| CN | 101108106 A | 1/2008 |
| CN | 101108110 A | 2/2008 |
| CN | 101657133 A | 2/2010 |
| DE | 69110424 T2 | 2/1996 |
| DE | 10132690 A1 | 7/2002 |
| DE | 60105004 T2 | 8/2005 |
| DE | 102005015004 B4 | 2/2008 |
| DE | 102005014541 B4 | 8/2008 |
| DE | 602004009782 T2 | 8/2008 |
| DE | 112007003039 T5 | 10/2009 |
| DE | 112007003052 T5 | 1/2010 |
| DE | 102008055045 A1 | 6/2010 |
| DE | 202012101457 U1 | 8/2012 |
| DE | 112012000251 T5 | 10/2013 |
| DE | 102012223983 A1 | 6/2014 |
| EP | 493950 A2 | 7/1992 |
| EP | 1676516 A1 | 7/2006 |
| EP | 1779761 A2 | 5/2007 |
| JP | 2003135335 A | 5/2003 |
| JP | 2010227287 A | 10/2010 |
| KR | 1020050091821 A | 9/2005 |
| KR | 1020050091824 A | 9/2005 |
| KR | 1020050091826 A | 9/2005 |
| KR | 1020050091829 A | 9/2005 |
| KR | 1020050091830 A | 9/2005 |
| KR | 1020050091833 A | 9/2005 |
| KR | 1020050091834 A | 9/2005 |
| KR | 1020050091835 A | 9/2005 |
| KR | 1020050091836 A | 9/2005 |
| KR | 1020050091837 A | 9/2005 |
| KR | 1020050091838 A | 9/2005 |
| KR | 1020050103343 A | 10/2005 |
| KR | 1020050104613 A | 11/2005 |
| KR | 1020050104614 A | 11/2005 |
| KR | 1020060018004 A | 2/2006 |
| KR | 1020060081229 A | 7/2006 |
| KR | 1020060112420 A | 11/2006 |
| KR | 1020060118795 A | 11/2006 |
| KR | 1020060118800 A | 11/2006 |
| KR | 1020060118801 A | 11/2006 |
| KR | 1020060118802 A | 11/2006 |
| KR | 1020060118803 A | 11/2006 |
| KR | 1020060122249 A | 11/2006 |
| KR | 1020080039105 A | 5/2008 |
| WO | 9640840 A1 | 12/1996 |
| WO | 0010718 A1 | 3/2000 |
| WO | 2007021043 A1 | 2/2007 |
| WO | 2007104138 A1 | 9/2007 |
| WO | 2009076773 A1 | 6/2009 |
| WO | 2009076774 A1 | 6/2009 |

OTHER PUBLICATIONS

English machine translation of KR1020060122249, published on Nov. 30, 2006.
English machine translation of KR1020060118803, published on Nov. 24, 2008.
English machine translation of KR1020060118802, published on Nov. 24, 2006.
English machine translation of KR1020060118801, published on Nov. 24, 2006.
English machine translation of KR1020060118800, published on Nov. 24, 2006.
Nicholas P. Cheremisinoff: Handbook of Air Pollution Prevention and Contriol, N&P Limited, published by Butterworth Heinemann, pp. 397-404, Copyright 2002. Elsevier Science, ISBN 0-7506-7499-7.
International Preliminary Report on Patentability, received in connection to international Patent Application No. PCT/CA2008/002257, dated Jun. 22, 2010.
International Search Report, received in connection to International Patent Application No. PCT/CA2008/002257, dated Apr. 14, 2009.
International Preliminary Report on Patentability, received in connection to International Patent Application No. PCT/CA2008/002258, dated Jun. 22, 2010.
International Search Report, received in connection to International Patent Application No. PCT/CA2008/002258, dated Apr. 9, 2009.
Extended European Search Report received in connection to European Application No./Patent No. 08862927.4, dated Sep. 13, 2011.
English machine translation of KR1020060118795, published on Nov. 24, 2006.
English machine translation of KR1020060112420, published on Nov. 1, 2006.
English machine translation of KR1020060081229, published on Jul. 12, 2006.
English machine translation of KR1020060018004, published on Feb. 28, 2006.
English machine translation of KR1020050104614, published on Nov. 3, 2005.
English machine translation of KR1020050104613, published on Nov. 3, 2005.
English machine translation of KR1020050103343, published on Oct. 31, 2005.
English machine translation of KR1020050091838, published on Sep. 15, 2005.
English machine translation of KR1020050091837, published on Sep. 15, 2005.
English machine translation of KR1020050091836, published on Sep. 15, 2005.
English machine translation of KR1020050091835, published on Sep. 15, 2005.
English machine translation of KR1020050091834, published on Sep. 15, 2005.
English machine translation of KR1020050091833, published on Sep. 15, 2005.
English machine translation of KR1020050091830, published on Sep. 15, 2005.
English machine translation of KR1020050091829, published on Sep. 15, 2005.
English machine translation of KR1020050091826, published on Sep. 15, 2005.
English machine translation of KR1020050091824, published on Sep. 15, 2005.
English machine translation of KR1020050091821, published on Sep. 15, 2005.
English machine translation of JP2010227287, published on Oct. 14, 2020.
English machine translation of JP2003135335, published on May 13, 2003.
Engliksh machine translation of CN101657133, published on Feb. 24, 2010.
English machine translation of DE69110424, published on Jul. 20, 1995.
English machine translation of DE602004009782, published on Aug. 28, 2008.
English machine translation of DE202012101457, published on Aug. 16, 2012.
English machine translation of DE112012000251, published on Oct. 17, 2013.

(56) References Cited

OTHER PUBLICATIONS

English machine translation of DE112007003052, published on 2010-01-14.
English machine translation of DE112007003039, published on Oct. 29, Oct. 29, 2009.
English machine translation of DE102012223983, published on Jun. 26, 2014.
English machine translation of DE102008055045, published on Jun. 24, 2010.
English machine translation of DE102005015004, published on Feb. 7, 2008.
English machine translation of DE102005014541, published on Aug. 28, 2008.
English machine translation of CN101108111A, published on Aug. 20, 2007.
English machine translation of CN101108110A, published on Feb. 23, 2008.
English machine translation of CN101108106A, published on Jan. 23, 2008.
English machine translation of CN101073480A, published on Nov. 21, 2007.
English machine translation of CN101061932A, published on Oct. 31, 2007.
English machine translation of CN101015436A, published on Aug. 15, 2007.
English machine translation of CN100998484A, published on Jul. 18, 2007.
English machine translation of DE60105004, published on Aug. 18, 2005.
English machine translation of DE10132690, published on Jul. 18, 2002.
English machine translation of CN1887437, published on Jan. 3, 2007.
English machine translation of CN1875855, published on Dec. 13, 2006.
English machine translation of CN1875846, published on Dec. 13, 2006.
English machine translation of CN1493244, published on May 5, 2004.
U.S. Appl. No. 09/343,479, filed Jun. 30, 1999.

\* cited by examiner

CONFIGURATION OF A CYCLONE ASSEMBLY AND SURFACE CLEANING APPARATUS HAVING SAME

CROSS REFERENCE TO RELATED APPLICATIONS

This application is a continuation of U.S. patent application Ser. No. 16/377,778, which was filed on Apr. 8, 2019, now allowed, which itself is a continuation of U.S. patent application Ser. No. 14/529,027, which was filed on Oct. 30, 2014 and issued as U.S. Pat. No. 10,327,612 on Jun. 25, 2019, which itself is a continuation of U.S. patent application Ser. No. 13/763,477, which was filed on Feb. 8, 2013 and issued as U.S. Pat. No. 8,898,857 on Dec. 2, 2014, which itself is a divisional application of U.S. patent application Ser. No. 12/338,022, which was filed on Dec. 18, 2008, now abandoned, which itself claims the benefit of priority under 35 U.S.C. 119 from U.S. Provisional Patent Application No. 61/014,983 filed on Dec. 19, 2007, the contents of each of which are incorporated herein by reference.

FIELD

This invention relates to a cyclone separator. In a preferred embodiment, the invention relates to a cyclonic separator, or a plurality of cyclonic separators in parallel, utilized as a cleaning stage in a surface cleaning apparatus such as a vacuum cleaner.

BACKGROUND

Cyclonic separators, including those used in vacuum cleaners are known in the art. Typically, a cyclonic separator has an inlet for fluid (air, liquid or and air and liquid mix) to be treated and an outlet for treated fluid. Dirt may be collected either in the cyclone chamber itself (e.g. in the bottom) or in a collection chamber in fluid communication with the cyclone separator. Various such constructions are known in the art.

U.S. Pat. No. 7,086,119 (Go et al) discloses a dust-collecting unit for a vacuum cleaner. The dust-collecting unit includes a cyclone separator having a dirt collection chamber positioned adjacent one lateral side of the cyclone separator. A dirt outlet is provided in the upper wall of the cyclone such that dirt may enter the adjacent dirt collection chamber through the outlet in the upper wall of the cyclone separator. A second dirt collection chamber is positioned below the cyclone chamber and is accessed by an opening formed in a separating plate that separates the cyclone chamber and the second dirt collection chamber. An openable bottom is provided. However, when the bottom is opened, the cyclone chamber is still closed by the separating plate.

U.S. Pat. No. 7,160,346 (Park) discloses a cyclone for use in a vacuum cleaner having a dirt collection space positioned below the cyclone chamber. A dirt outlet is provided as an annular gap between the sidewall of the cyclone chamber and a separating plate for permitting dirt to travel downwardly from the cyclone into the dirt collection chamber. Accordingly, the dirt collection chamber is not exterior to the cyclone casing but is within the casing.

SUMMARY

In accordance with this invention, a cyclone separator is provided that comprises a fluid inlet provided in a first portion, a separated material outlet provided in a spaced apart, opposed second portion and being in communication with a separated material collection chamber and a side wall. The separated material collection chamber is spaced a sufficient distance from the cyclone casing (at least portions of the side and the opposed second portion) to enhance the separation efficiency of the cyclone separator. In particular, the separated material collection chamber is spaced from at least some of the cyclone casing by at least 0.5 inches.

The separated material collection chamber may surround all or a portion of the cyclone casing and is exterior to the portion of the cyclone casing having the separated material outlet. The sidewall of the cyclone casing has an inlet section and a second section and the fluid inlet is provided on the inlet section. Accordingly, the sidewall of the separated material collection chamber facing the sidewall of the second section of the cyclone casing is spaced apart by at least about 0.5 inches and, the separated material collection chamber has an opposed surface facing the second portion of the cyclone casing by at least about 0.5 inches.

Surprising, it has been determined that such positioning of the separated material collection chamber enhances the separation efficiency of the cyclone separator.

The separated material collection chamber (e.g., a dirt collection chamber) may extend completely around the cyclone casing. Accordingly, fluid will enter a cyclone chamber through the fluid inlet at one end and travel towards the distal end wall of the cyclone chamber. As the fluid travels through the cyclone chamber, it will rotate and heavier material (e.g. particulate matter) will exit the cyclone chamber via the separated material outlet. The fluid will then reverse direction and exit the cyclone chamber through the fluid outlet.

Preferably, the cyclone separator is provided with an inwardly directed transition member that extends between the sidewall of the cyclone casing and an end wall of the cyclone casing. The transition member may extend at an angle or may be curved inwardly. If the cyclone separator is oriented in an upright fashion, then the fluid inlet is provided adjacent the upper end of the cyclone and the fluid exit may also be provided adjacent the upper end of the cyclone. Accordingly, the transition member would extend downwardly and inwardly from the sidewall to the lower end wall that is positioned distal to the fluid inlet. It will be appreciated that if the cyclone separator were to be inverted, then the fluid inlet would be positioned on the bottom and the end wall would be positioned above the inlet (e.g., the end wall would be an upper end wall). In such an orientation, the transition member will extend upwardly and inwardly from the sidewall to the end wall. It will also be appreciated that the cyclone separator could also be oriented horizontally, or at any other angle.

Preferably, the separated material outlet is provided adjacent the end wall distal to the fluid inlet and, more preferably, the dirt outlet is provided at least partially in the transition member. Most preferably, the dirt outlet is provided in the transition member.

In accordance with an aspect of the present invention, there is provided a cyclone separator comprising:
  (a) a cyclone casing defining a cyclone chamber and having first and second spaced apart portions, a sidewall, a fluid inlet, a fluid outlet and a separated material outlet, the first portion including a first end and the second portion including an opposed second end;

(b) the fluid inlet provided in the first portion;
(c) the separated material outlet provided in the second portion and being in communication with a separated material collection chamber;
(d) the sidewall having an inlet section and a second section, the fluid inlet provided on the inlet section;
(e) the separated material collection chamber having a sidewall and surrounding at least a portion of the cyclone chamber wherein the sidewall of the separated material collection chamber facing the sidewall of the second section of the cyclone casing is spaced apart by at least about 0.5 inches; and,
(f) the separated material collection chamber has an opposed surface facing the second end and spaced from the second end by at least about 0.5 inches.

It will be appreciated by those skilled in the art that the cyclone separator disclosed herein may be utilized with any fluid stream (e.g. liquid and/or gas). In addition, it will be appreciated by those skilled in the art that the cyclone separator may be used in any consumer appliance and, preferably, is utilized in a surface cleaning apparatus or an air cleaner. The surface cleaning apparatus may be a vacuum cleaner, including an upright vacuum cleaner, a stick vacuum cleaner, a canister vacuum cleaner, a back pack vacuum cleaner, a strap carriable vacuum cleaner or a portable vacuum cleaner; a carpet extractor, a bare floor cleaner or the like.

DETAILED DESCRIPTION

Figure 1:
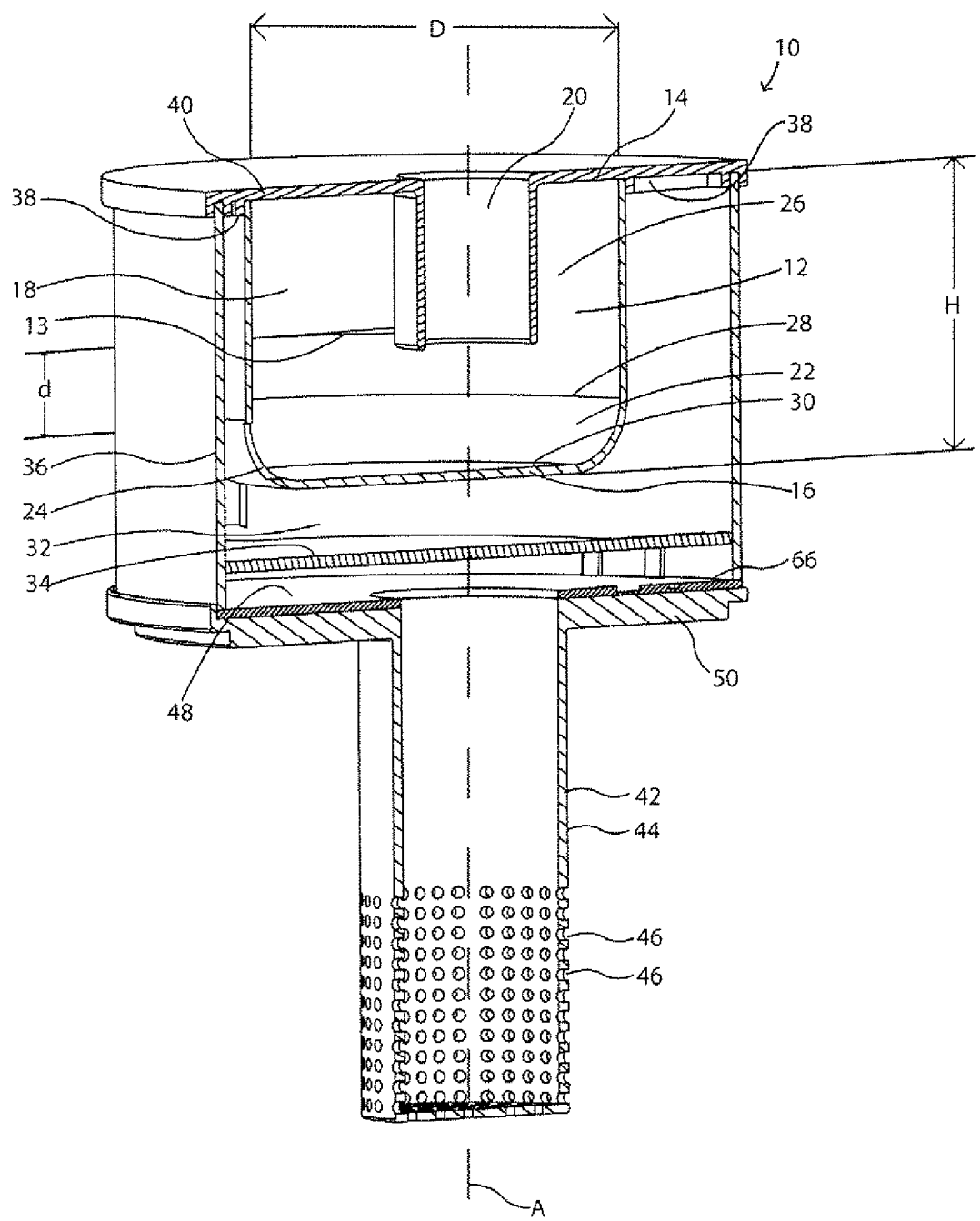
FIG. 1 is a perspective vertical section through a cyclone separator according to a first embodiment of this invention wherein the cyclone separator is oriented in an upright fashion.
Figure 1A:
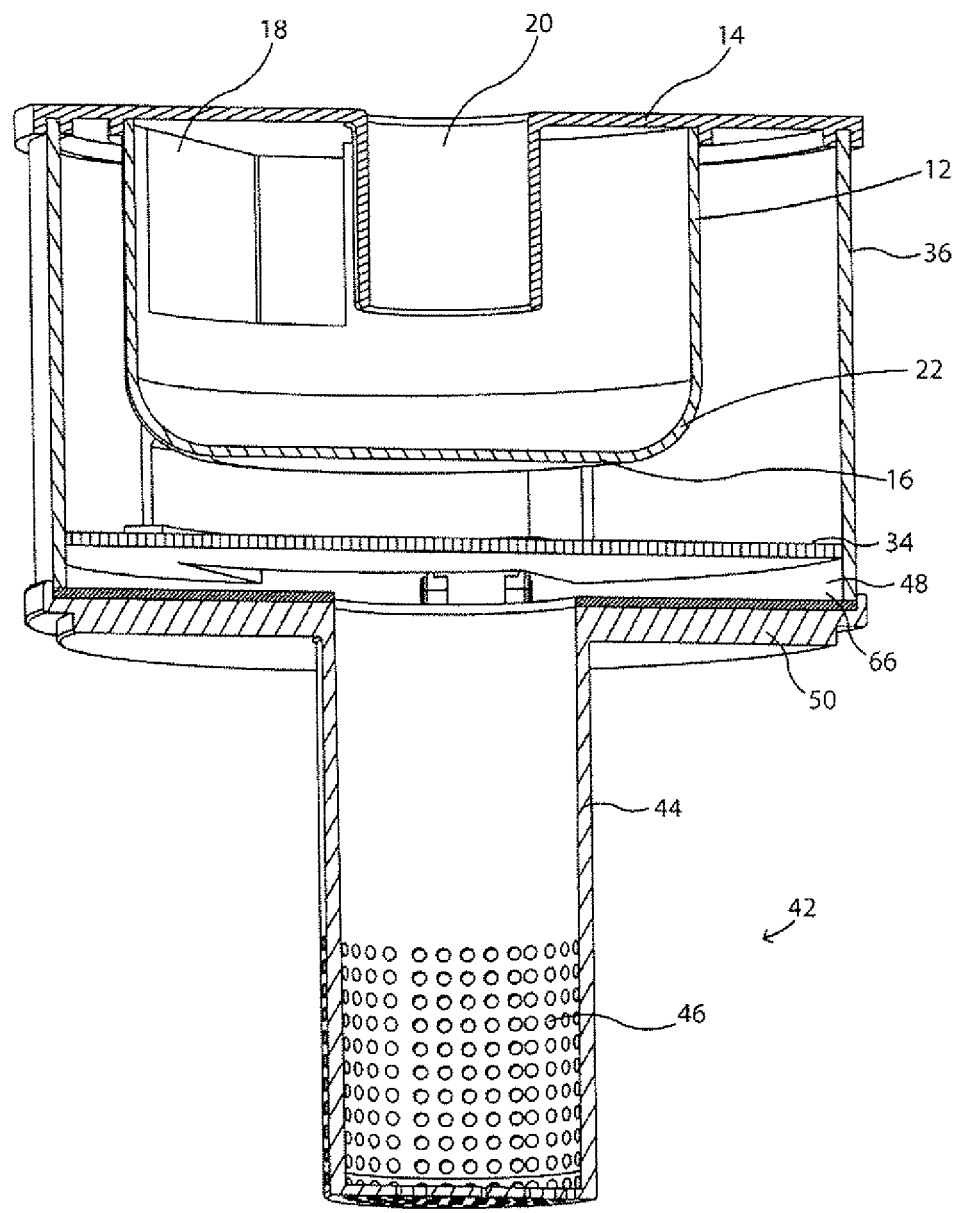
FIG. 1a is a vertical section through the cyclone separator of FIG. 1.
Figure 1B:
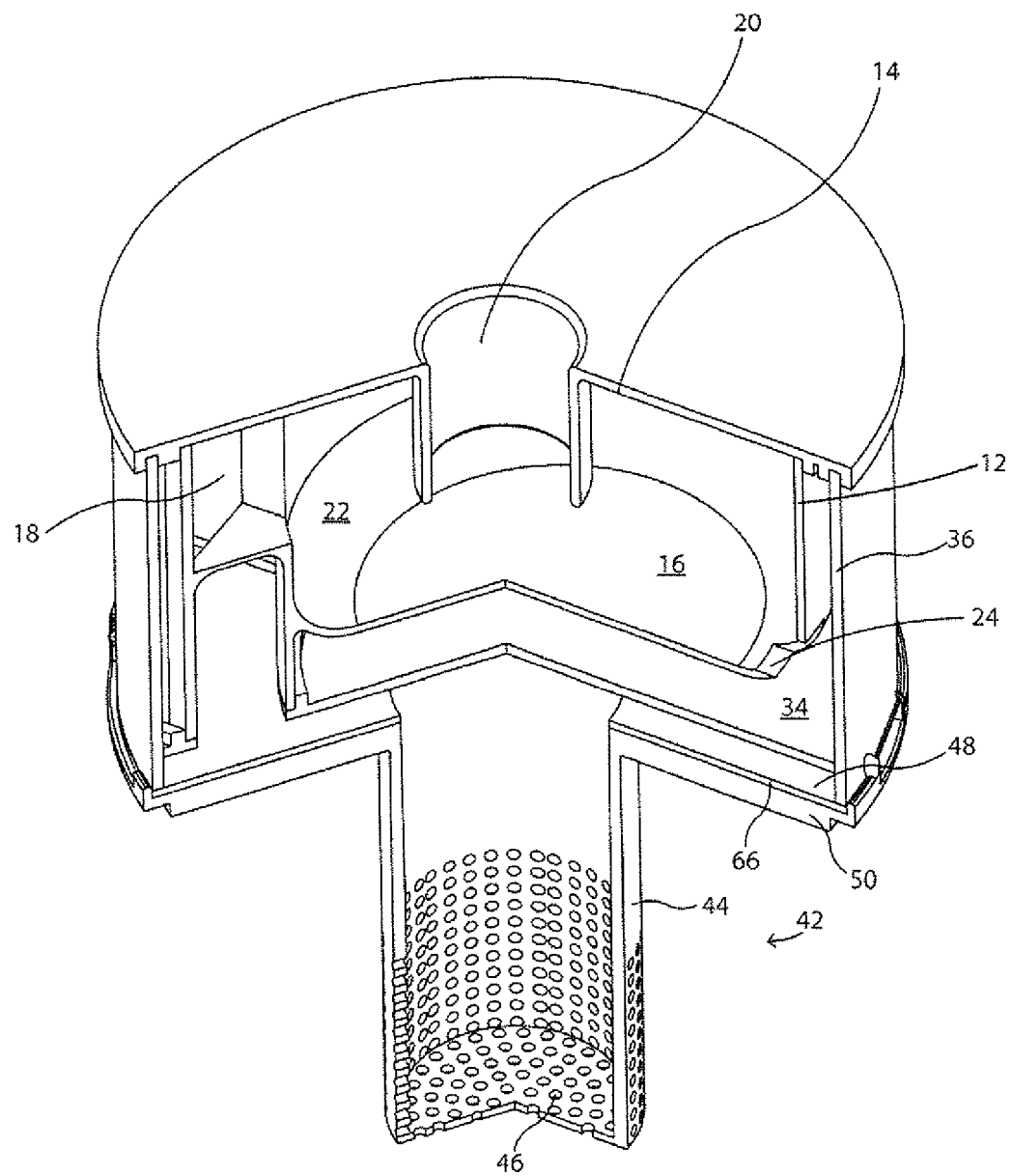
FIG. 1b is a perspective vertical section looking downwardly through the cyclone separator of FIG. 1.

In the following description of the preferred embodiment, the cyclone separator is described as used in a vacuum cleaner of any particular design. As exemplified in FIG. 22, surface cleaning apparatus 120 may be an upright vacuum cleaner having a surface cleaning head 122 and a vacuum cleaner body 124 pivotally mounted thereto. Handle 126 may be provided for moving surface cleaning apparatus 120. Surface cleaning apparatus 120 has a first cyclonic cleaning stage 128 and a second cyclonic cleaning stage 130. However, it will be appreciated that the description set out herein is not confined to such uses as may be used for any other application referred to herein or known in the art.

As exemplified in FIGS. 1-5, a cyclone separator assembly 10 comprises a cyclone casing defining a cyclone chamber 26 and comprising a sidewall 12, air or fluid inlet 18, air or fluid outlet 20, optional transition member 22 and a dirt or separated material outlet 24. The cyclone casing has first and second spaced apart portions. The first portion comprises first end wall 14 and the second portion comprises an opposed second end wall 16. A separated material collection chamber or dirt collection chamber 32 is provided exterior to cyclone chamber 26.

First and second end walls 14 and 16 are spaced apart and are positioned opposite each other. Preferably, as exemplified, air inlet 18 is provided in sidewall 14 and, more preferably, adjacent first or upper end 14. In addition, air outlet 20 is preferably provided in upper first end 14 and, preferably, is centrally located therein. As exemplified in FIG. 14, the lower end of outlet 20 is preferably positioned above the top of dirt outlet 24. Accordingly, as exemplified in a vertical orientation in FIG. 2, air entering the cyclone casing will travel in a cyclonic fashion downwardly towards second lower end wall 16. Heavier material, e.g. particulate material, will exit cyclone chamber 26 via dirt outlet 24. The air at some point reverses direction and travels upwardly through outlet 20 to exit cyclone chamber 26.

As shown in FIG. 1, sidewalls 18 preferably extend linearly (i.e. it is straight) and, in the orientation shown in FIG. 1, vertically. Preferably, sidewall 18 meets upper end wall 14 at about 90° such that upper first end wall 14 is essentially perpendicular to sidewall 18. In addition, lower second end wall 16 is preferably parallel to first end wall 14. Accordingly, but for transition member 22, the cyclone casing is exemplified as being cylindrical. It will be appreciated that while cyclone separator 10 is preferably generally cylindrical, it may have other shapes. For example, it may be frustoconical as is also known in the art. In addition, air inlet 18 and air outlet 20 may be of any construction and positioning known in the art.

Transition member 12 is provided adjacent lower end wall 16 and preferable is immediately adjacent lower end wall 16. Accordingly, transition member 22 may link sidewall 18 and lower end wall 16. For example, as exemplified in FIG. 1, transition member 22 extends between lower end 28 of sidewall 18 and outer end 30 of lower end wall 16. If the cyclone separator is oriented as shown in FIG. 1 (it is in an upright orientation), then transition member 22 extends downwardly and inwardly.

It will be appreciated that transition member 22 may have a variety of configurations. For example, transition member 22 may be a single surface that extends at an angle from lower end 28 of sidewall 18 to outer end 30 of lower end wall 16 (see for example FIGS. 15 and 16). As exemplified, sidewall 18 extends between the first end 14 and transition member 22 in a first direction (vertically), second end 16 extends in a second direction (horizontally), and transition member 22 extends in at least one third direction from sidewall 18 to the second end 16. Accordingly, it will be appreciated that the transition member extends in a third direction (other than the direction of sidewall 18 and the direction of end wall 16). Accordingly, transition member 22 may be at an angle to the longitudinal axis of sidewall 18, at an angle to the longitudinal axis A of the cyclone separator itself and at an angle to the plane of lower end 16 (the horizontal plane as exemplified in FIGS. 15 and 16).

Alternately, a plurality of angled surfaces may be provided. Alternately, and preferably, transition member 22 may be curved and, more preferably, is radiused. In a particularly preferred embodiment, transition member 22 describes part of an arc of a circle which may have a radius from 0.125 inches to 2 inches, more preferably from 0.25 to 1 inch, even more preferably from about 0.375 to 0.75 inches and most preferably about 0.5 inches.

Figure 17:
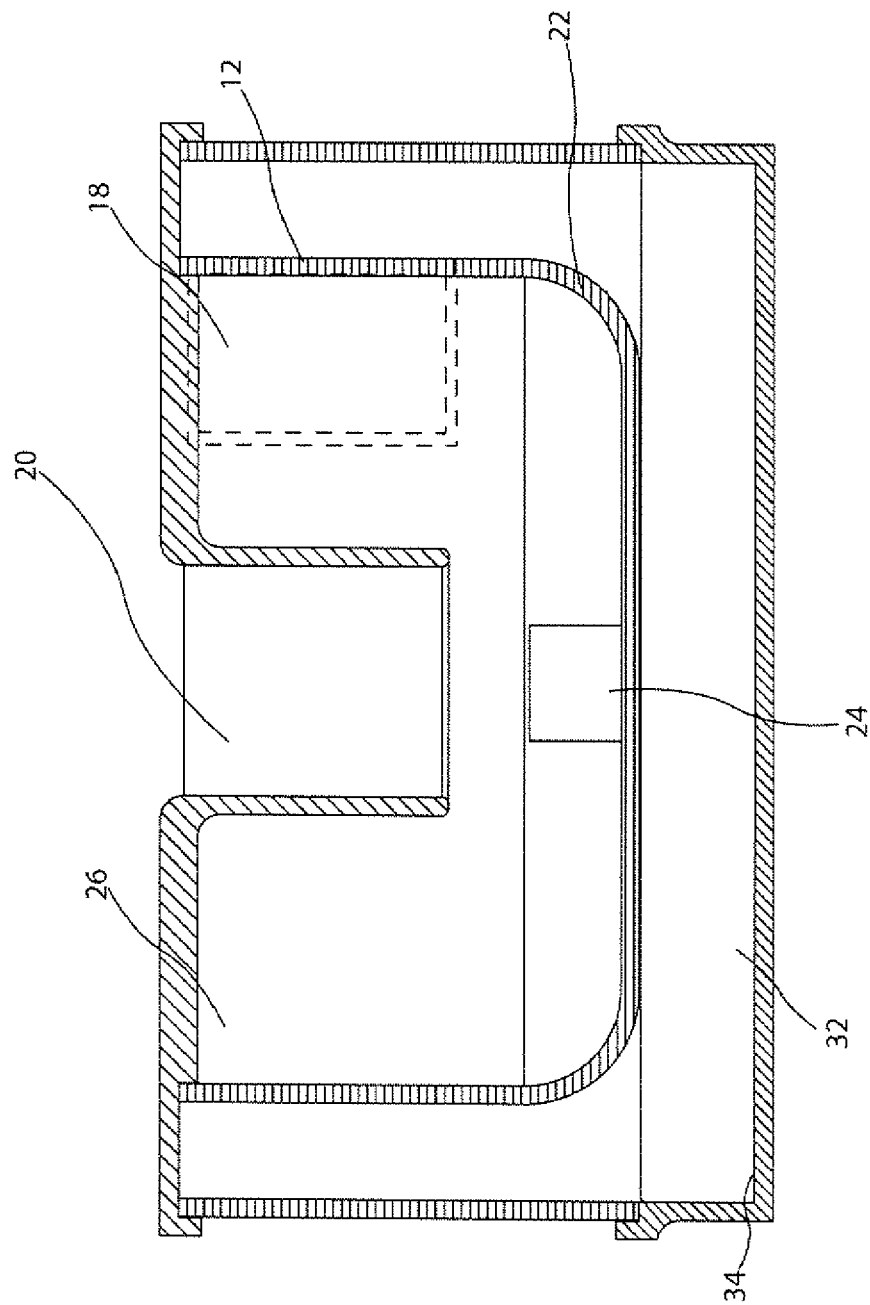
FIG. 17 is a front view of a vertical section of a cyclonic cleaning stage according to a sixth embodiment of this invention wherein the transition member is rounded, the cyclonic cleaning stage comprises a single cyclone and the separated material outlet extends above the transition member and is positioned about 270° around the cyclone casing in a flow direction from the fluid inlet.

Preferably, dirt outlet 24 is provided in a lower portion of the cyclone separator. Preferably, if transition member 22 is provided, at least a portion of dirt outlet 24 is provided in transition member 22. For example, as exemplified in FIGS. 17 and 18, dirt outlet 24 may extend above transition member 22. Preferably, as exemplified in FIG. 1, dirt outlet 24 is positioned completely within transition member 22. For example, as exemplified in FIG. 14, dirt outlet 24 extends to the juncture of transition member 22 and sidewall 18. Alternately, as exemplified in FIG. 15, dirt outlet 24 may terminate at a position below the juncture of transition member 22 and sidewall 18.

Figure 12:
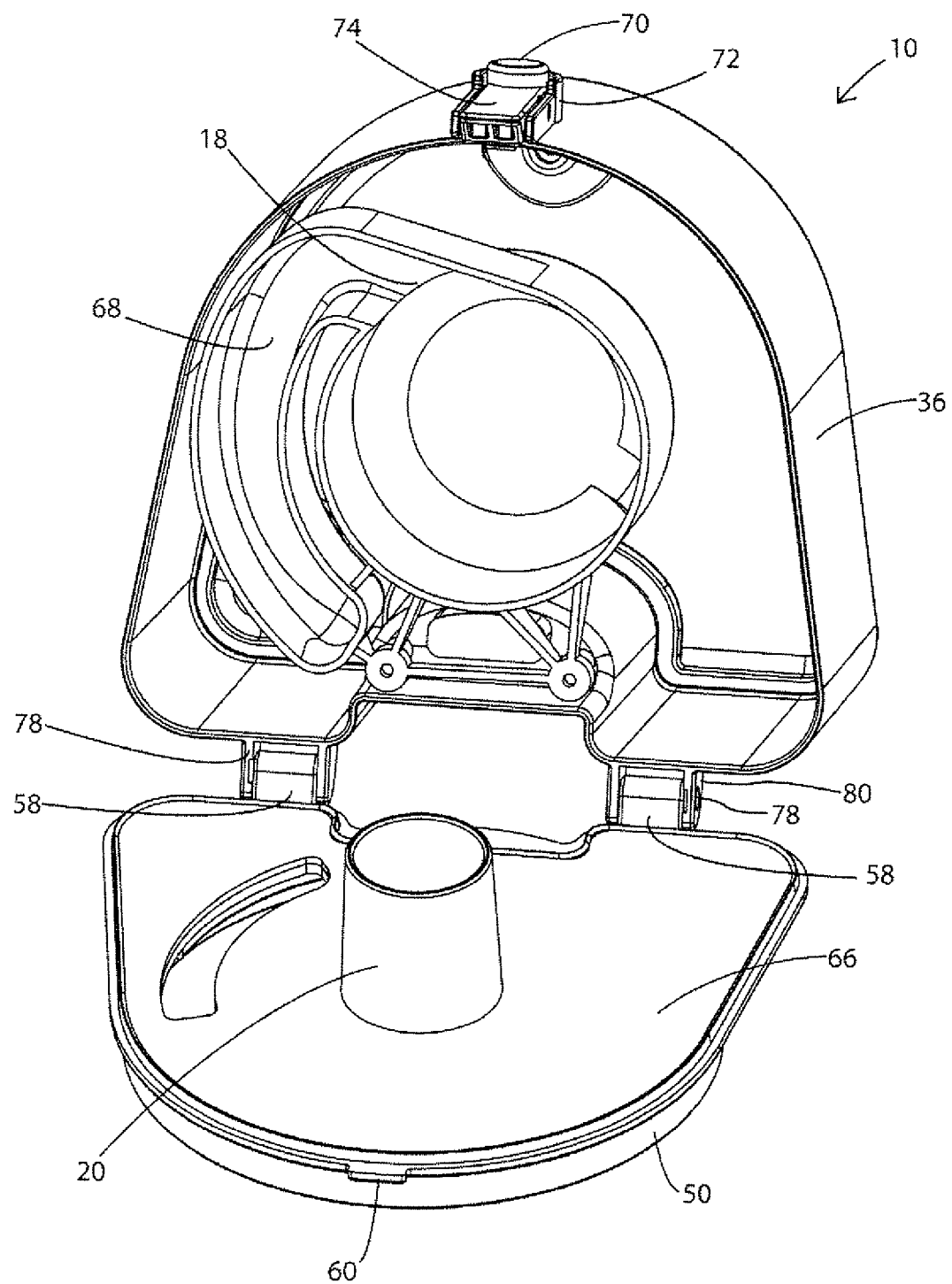
FIG. 12 is an end view of the opened cyclone separator shown in FIG. 11.
Figure 18:
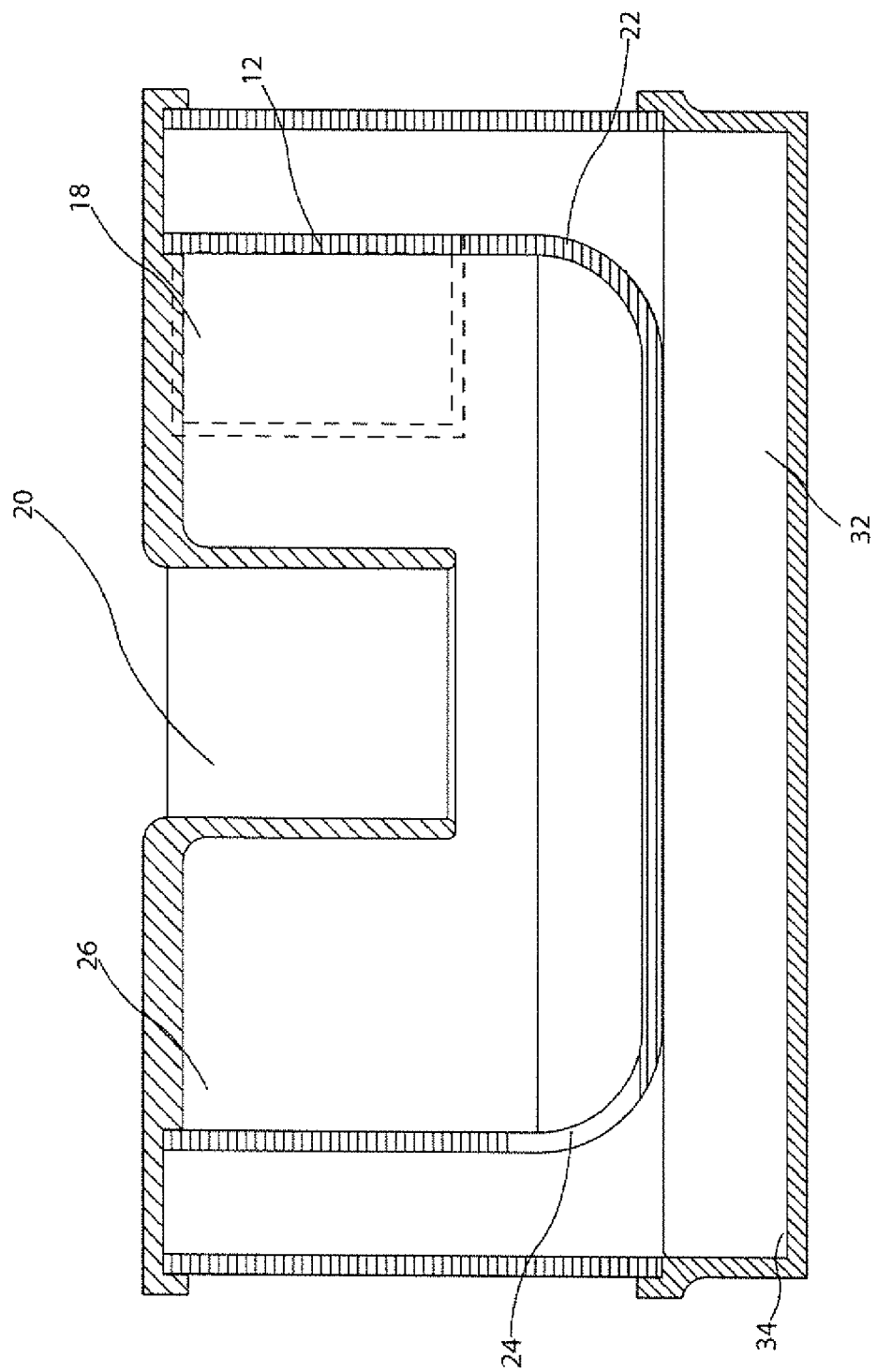
FIG. 18 is a front view of a vertical section of a cyclonic cleaning stage according to an seventh embodiment of this invention wherein the transition member is rounded, the cyclonic cleaning stage comprises a single cyclone and the separated material outlet extends above the transition member and is positioned opposed to the air inlet.

One or more dirt outlets 24 may be provided for a single cyclone chamber 26. Preferably, a single dirt outlet 24 is provided, as exemplified in FIG. 1. The one or more dirt outlets 24 may be positioned at any angular displacement B with respect to inlet 18 (see for example FIG. 21). Dirt outlet may be displaced from about 90 to about 330 degrees, preferably from about 180 to about 300 degrees, more preferably from about 240 to about 300 degrees and most preferably about 270 degrees in the flow direction from air inlet 18. For example, as shown in FIGS. 12 and 18, dirt outlet 24 may be displaced about 180 degrees in the flow direction around cyclone chamber 26 from inlet 18 (i.e., dirt outlet 24 is generally opposed to air inlet 18). Alternately, as exemplified in FIG. 17, dirt outlet may be displaced about 90 degrees in the flow direction around cyclone chamber 26 from inlet 18. It is preferred that outlet 24 having such an angular positioning is provided in a lower portion of the cyclone casing as discussed herein.

As shown in FIG. 1, the cyclone chamber has a height H (i.e., the distance between first and second opposed end walls 14 and 16) and a diameter D (i.e. the diameter of sidewall 12). Accordingly, height H is the combined height of sidewall 18 and transition member 22. In a broad aspect of this invention, height H and diameter D may be any of those known in the art. Preferably, height H is less than diameter D and, more preferably, height H is less than half of the diameter D.

It will be appreciated that transition member 22 may have any desired length. Accordingly, transition member 22 may extend from end wall 16 to inlet 18. However, it is preferred that a portion of sidewall 12 is provided between inlet 18 and transition member 24. For example, as shown in FIG. 1, sidewall 12 has a portion having a distance d that extends from bottom 13 of inlet 18 to lower end 28 of sidewall 18. Preferably, this section of sidewall is straight and, more preferably parallel to axis A (e.g., vertical as exemplified in FIG. 1 wherein the cyclone separator is oriented with the longitudinal axis A of the cyclone extending vertically). In particular, it is preferred that the section of sidewall having a length d is parallel to the longitudinal axis A of cyclone chamber 26. Lower end 13 of inlet 12 is preferably closer to second lower end 16 than first upper end 14. Accordingly, distance d may be less than the vertical height of the inlet 12.

Figure 8:
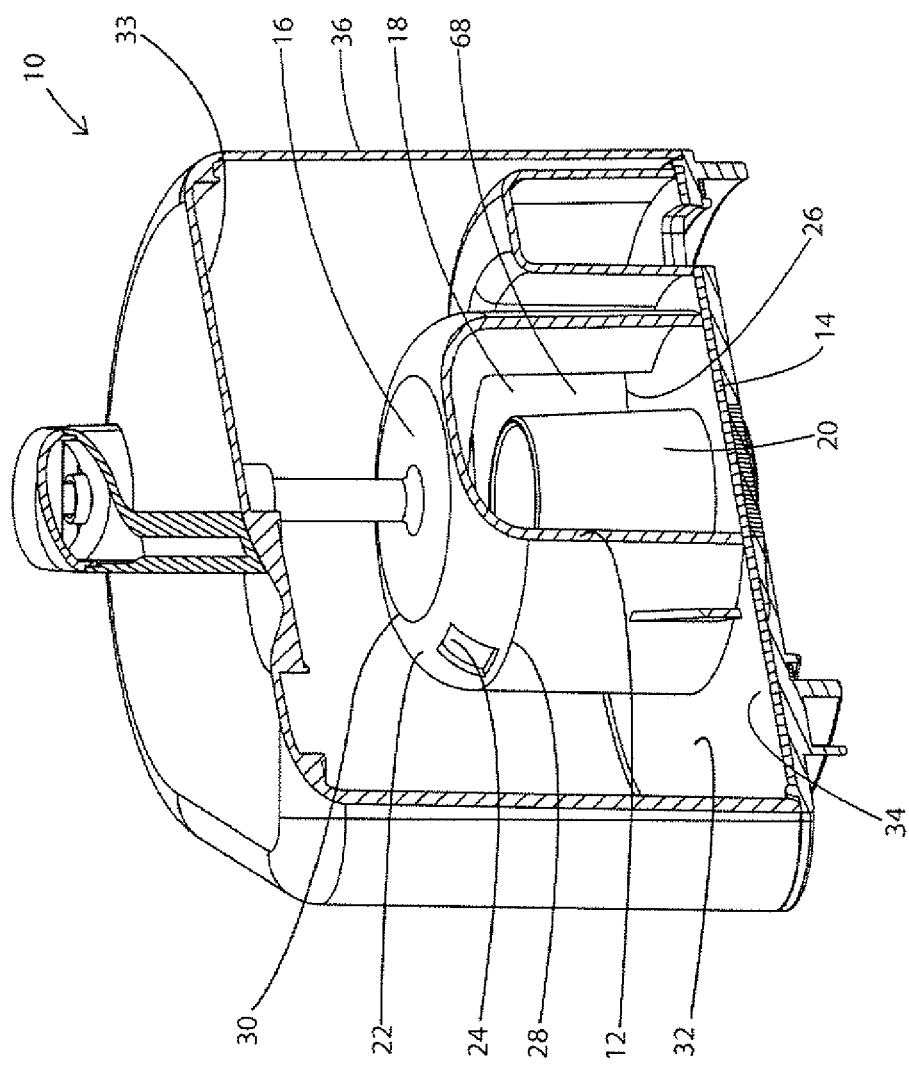
FIG. 8 is a vertical section through a cyclone separator according to a second embodiment of this invention wherein the cyclone separator is inverted.

Dirt collection chamber or separated material collection chamber 32 is positioned in fluid flow communication with dirt outlet 24 and exterior to cyclone chamber 26. Dirt outlet 24 is a lateral outlet, i.e., the outlet is provided in sidewall 18 or transition member 22 so that the separated material travels at least partially laterally as it exits cyclone chamber 26. In the embodiment of FIG. 8 wherein the cyclone is inverted, the upper end (second end 16) may be open. In such a case, the open end would function as the dirt outlet.

Figure 2:
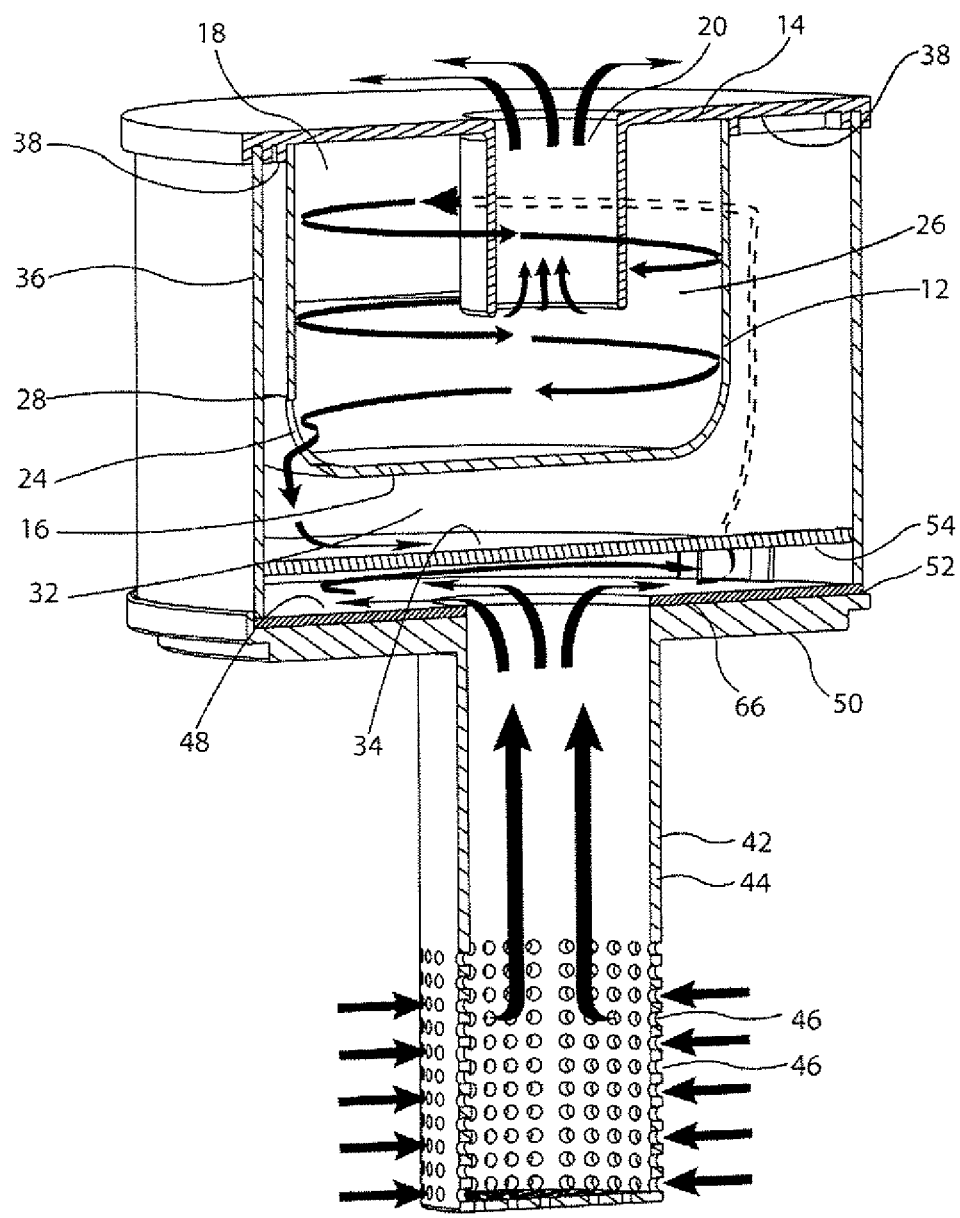
FIG. 2 is a vertical perspective view as shown in FIG. 1 including the air flow and dirt flow path through the cyclone separator.
Figure 3:
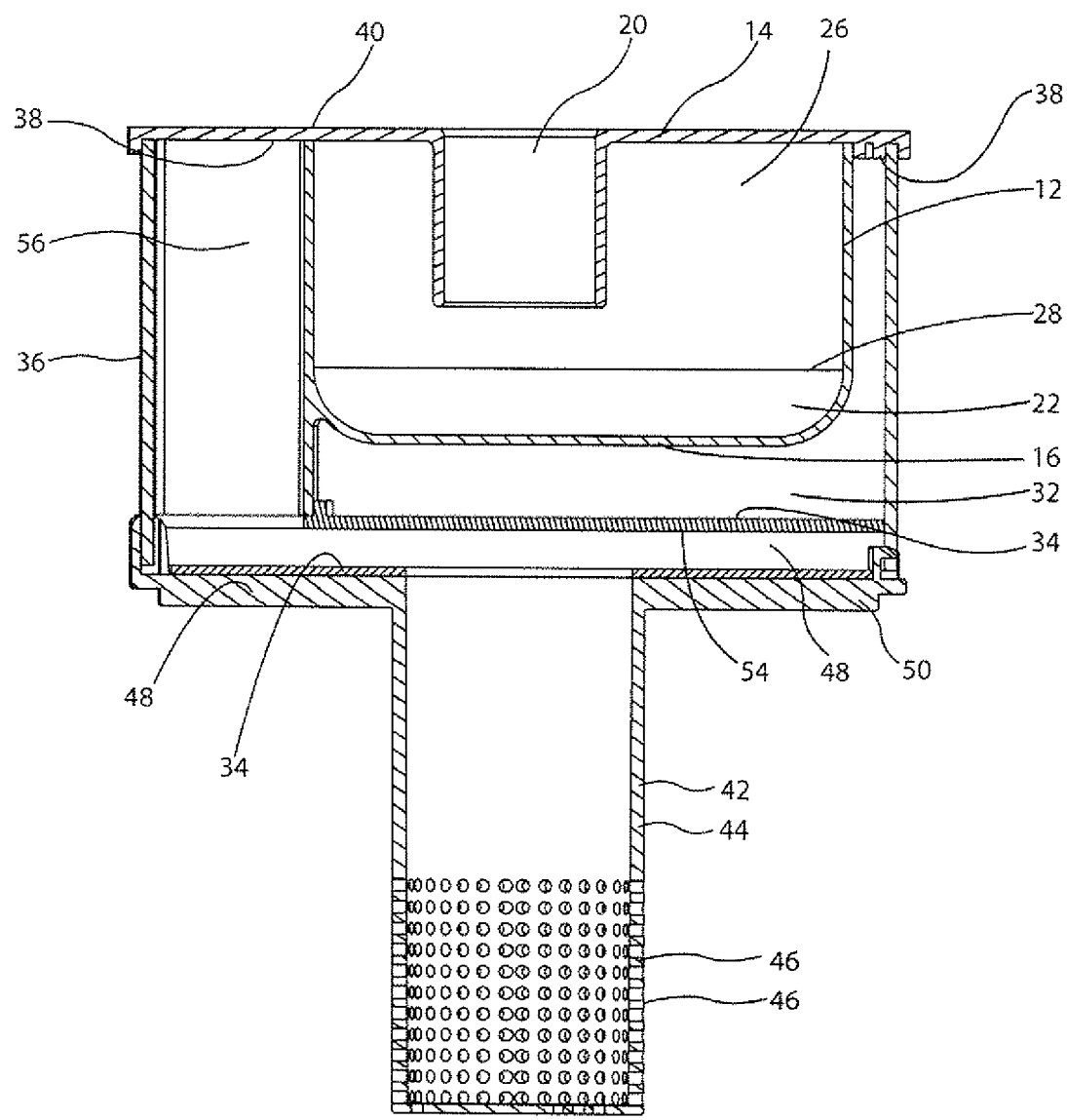
FIG. 3 is a side view of the vertical section of FIG. 1.

Dirt collection chamber 32 may be of any shape. As shown in FIG. 2, dirt or other heavy material will exit cyclone chamber 26 laterally via outlet 24 and then travel downwardly to accumulate on collection surface 34. As exemplified, dirt collection chamber 32 has a collection surface 34, sidewall 36 and a top wall 38.

Dirt collection chamber 32 surrounds at least a portion of the cyclone casing. Preferably, dirt collection chamber 32 surrounds the portions of the sidewall of the cyclone casing that are not provided with inlet 18. Alternately, as exemplified in FIG. 21, it may surround all of sidewall 12. The sidewalls of the cyclone casing and the collection chamber are spaced apart so as to define a gap, that may be an annular gap G if it fully surrounds the cyclone casing, that has a width D. Accordingly, the cyclone casing may be positioned fully within dirt collection chamber 32 as exemplified in FIG. 1.

In addition, the surface of collection chamber 32 opposed to and facing second end 16 (collection surface 34 in the cyclone is oriented upright and opposed surface 33 if the cyclone is inverted) is spaced from end 16 of the cyclone casing. Preferably, collection surface 34 is an opposed surface facing the second end 16 and spaced from the second lower end 16 by at least about 0.5 inches.

Preferably, sidewall 12 may have an inlet section and a second section, and fluid inlet 18 is provided on the inlet section and the portion of sidewall 36 of separated material collection chamber 32 facing the second section of sidewall 12 of the cyclone casing is spaced apart by at least about 0.5 inches. As exemplified a gap having a width $D_{g1}$ may be provided around the second section of sidewall 12. Distance $D_{g1}$ is at least 0.5 inches. It will be appreciated that the annular gap $D_{g1}$ may be larger and need not have a uniform width. Further, a gap having a width $D_{g2}$ may be provided around the inlet section of sidewall 12. It will be appreciated that width $D_{g2}$ may be less than 0.5 and may be zero such that wall 69 of passage 68 merges with sidewall 36 of collection chamber 32 (see for example the embodiment of FIG. 14).

Figure 21:
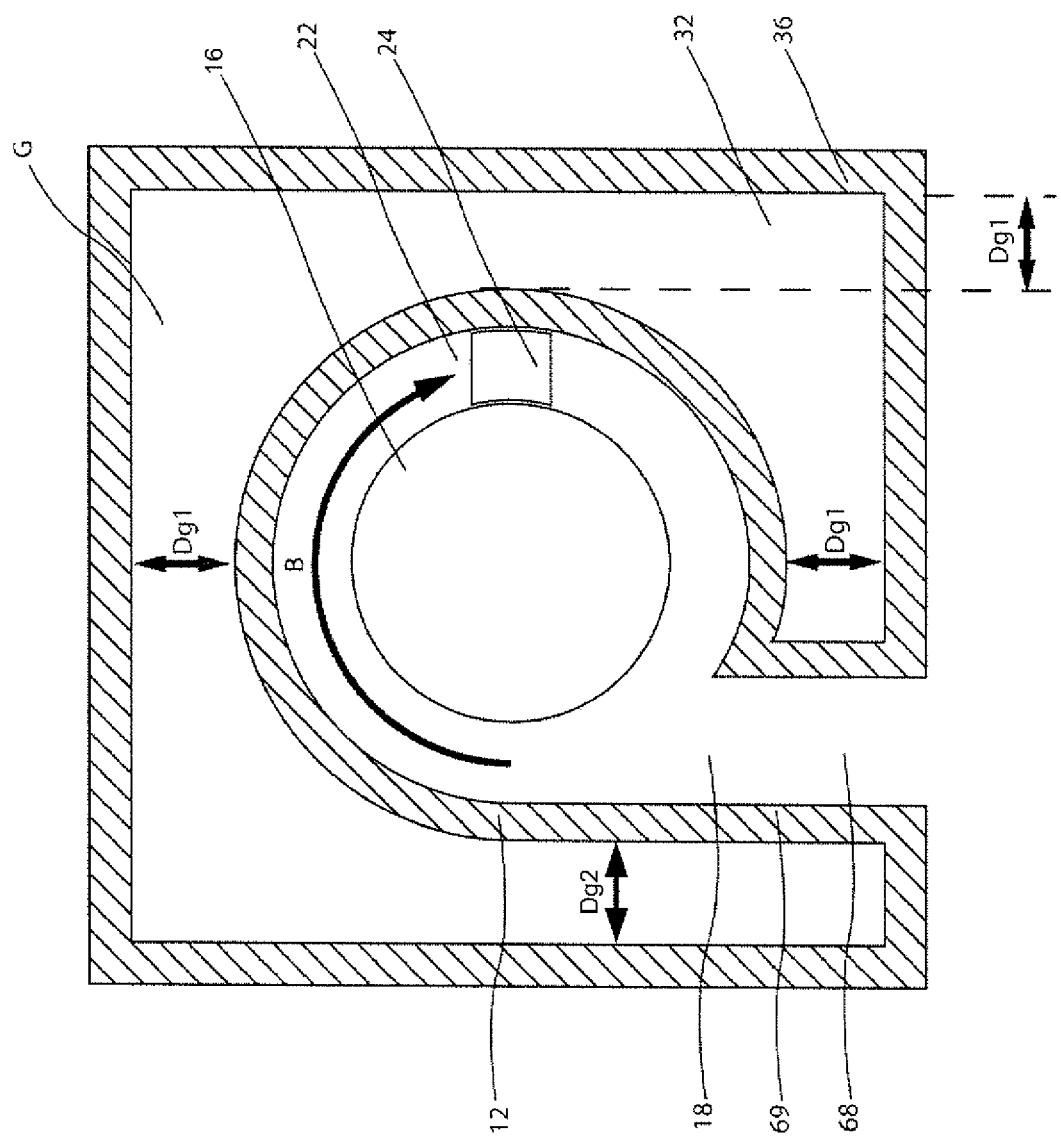
FIG. 21 is a top plan view of a cyclone chamber and a dirt collection chamber according to a ninth embodiment of this invention; and, FIG. 22 is a perspective view of a surface cleaning apparatus utilizing a cyclone separator assembly as setout herein

It will be appreciated that if the cyclone casing is positioned completely within dirt collection chamber 32 (i.e. dirt collection chamber 32 extends completely around the cyclone separator as exemplified in FIG. 21) then, top wall 38 of dirt collection chamber 32 may be annular in shape (i.e., extend between sidewall 12 of the cyclone and sidewall 36 of the dirt collection chamber 32).

Figure 4:
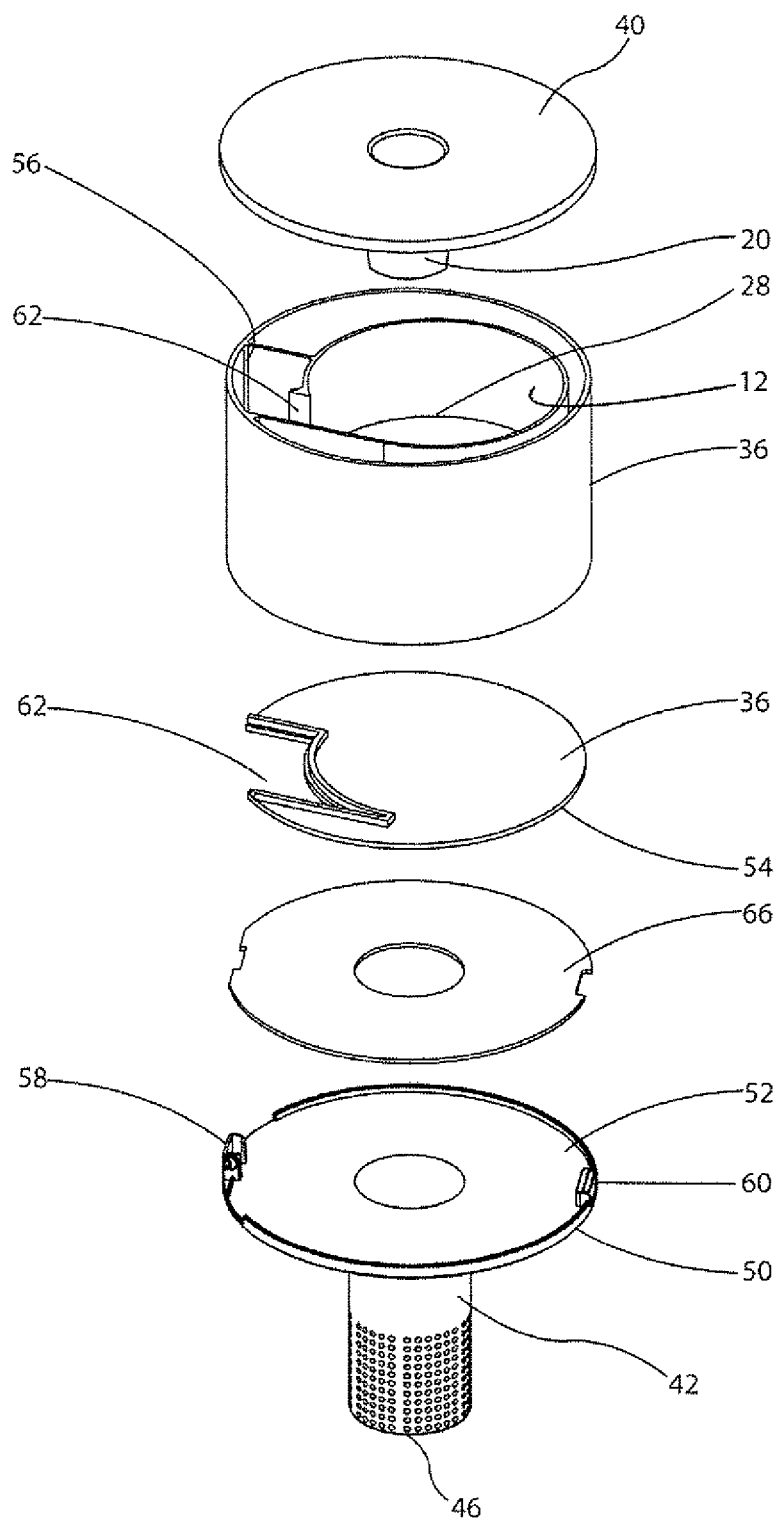
FIG. 4 is an exploded view of the cyclone separator of FIG. 1.
Figure 5:
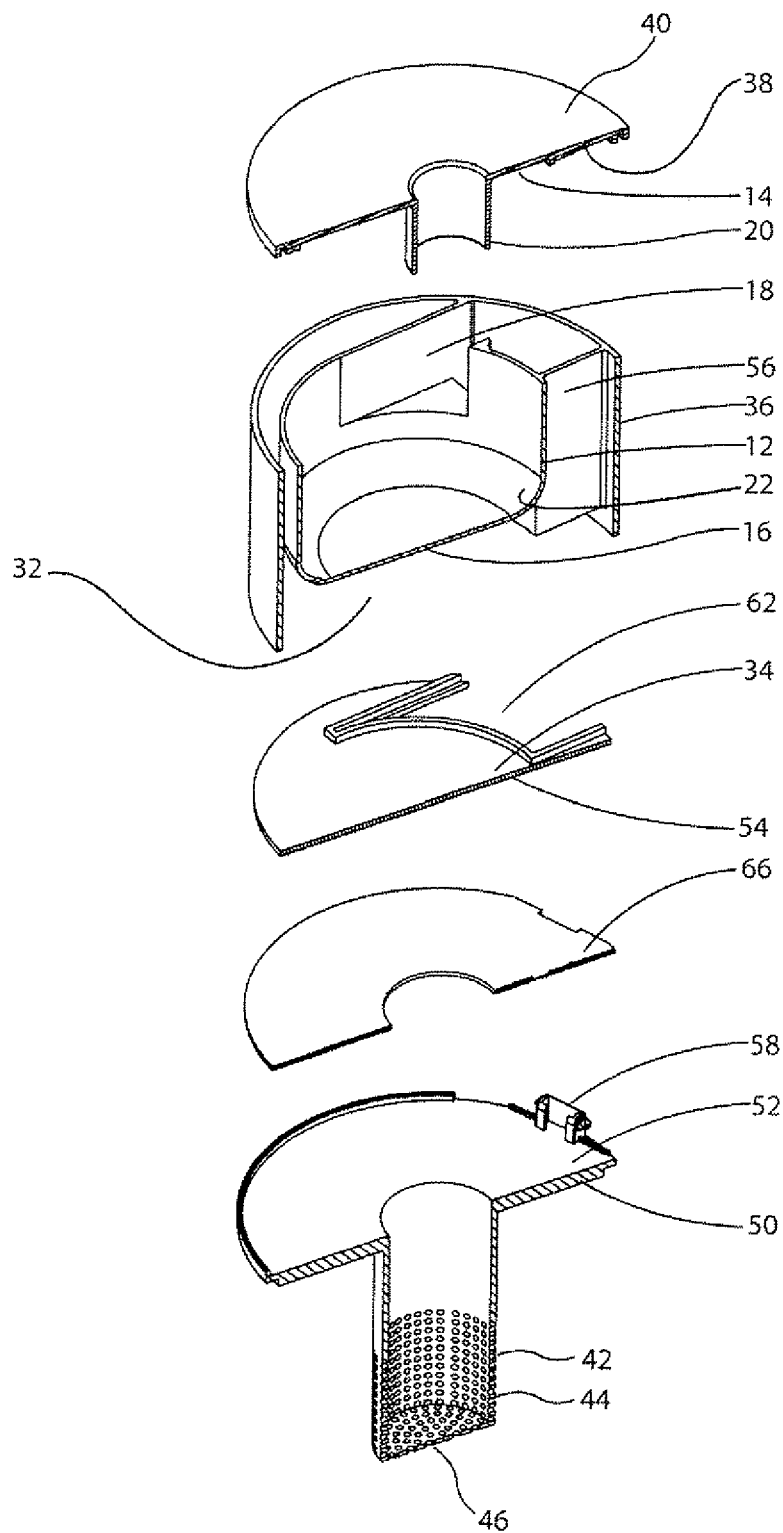
FIG. 5 is a vertical section through the exploded view of FIG. 4.

As exemplified in FIG. 4, top wall 38 of dirt collection chamber 32 and upper first end wall 14 of cyclone chamber 36 may be connected together and are preferably integrally molded as a continuous plate 40. Preferably, air outlet 24 may be provided as part of plate 40 and may be integrally molded therewith.

Figure 22:
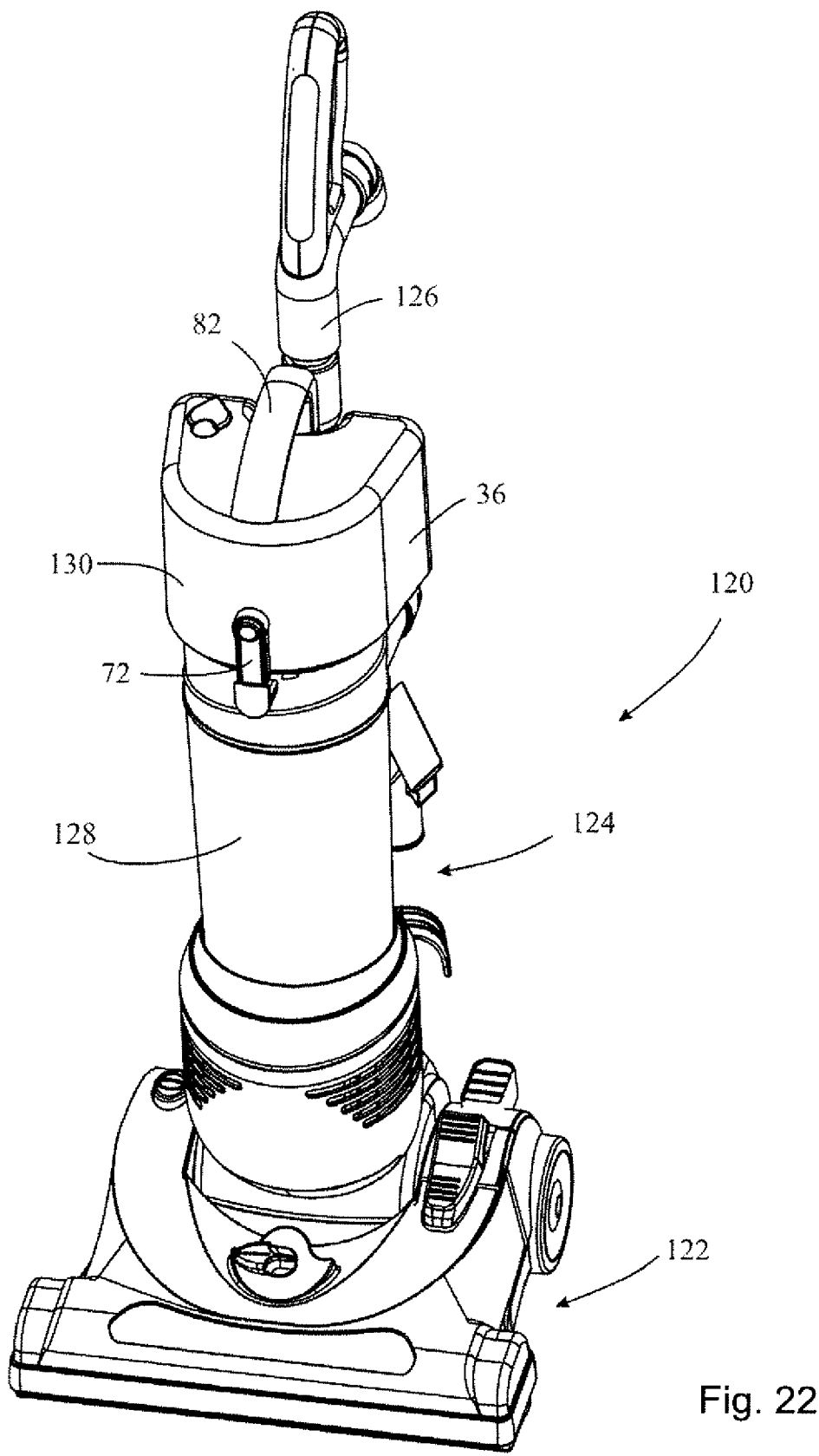

As exemplified in FIGS. 1 and 22, cyclone separator assembly 10 may be provided as a second cyclonic stage 130. Accordingly, cyclone separator assembly 10 preferably has provided as part thereof the air outlet or vortex finder 42 of an upstream cyclonic stage 128 (which is preferably a single cyclone but, as will be appreciated, could be a plurality of cyclones in parallel wherein the vortex finder of each is secured to, and removable with, cyclone separator assembly 10). Preferably, outlet 42 comprises a tubular member having sidewalls 44 wherein apertures 46 may be provided in a lower end thereof. Alternately, it will be appreciated that any air outlet or vortex finder of a cyclone known in the art may be utilized, and need not be provided as part of cyclone separator assembly 10. Vortex finder 42 is preferably attached to the bottom of cyclone separator assembly 10, e.g., bottom panel 50, and may be molded as part of bottom panel 50.

If the cyclone is downstream from another filtration member or air treatment member, then air inlet 18 may be in airflow communication therewith by any means known in the art. In a particularly preferred embodiment as illustrated in FIGS. 1-5, cyclone separator assembly 10 may incorporate an airflow passage from an upstream filtration stage to inlet 18. As illustrated therein, outlet 42 is in airflow communication with header 48. Header 48 is positioned between bottom panel 50 having an upper surface 52 and a lower surface 54 of collection surface 34.

If bottom panel 50 is openably, then in order to provide an airtight seal for bottom panel 50, a sealing gasket 66, O-ring or other sealing member known in the art may be provided. Gasket 66 may be mounted to, or removably mounted to, pivoting bottom 50. In such a case, header 48 maybe positioned between gasket 66 and lower surface 54 of collection surface 34. From header 48, the air travels upwardly trough side air passage 56 (see FIGS. 3, 4 and 5). It will be appreciated that air passage 56 may be of any configuration known in the art. The airflow path is exemplified in FIG. 2.

Figure 7:
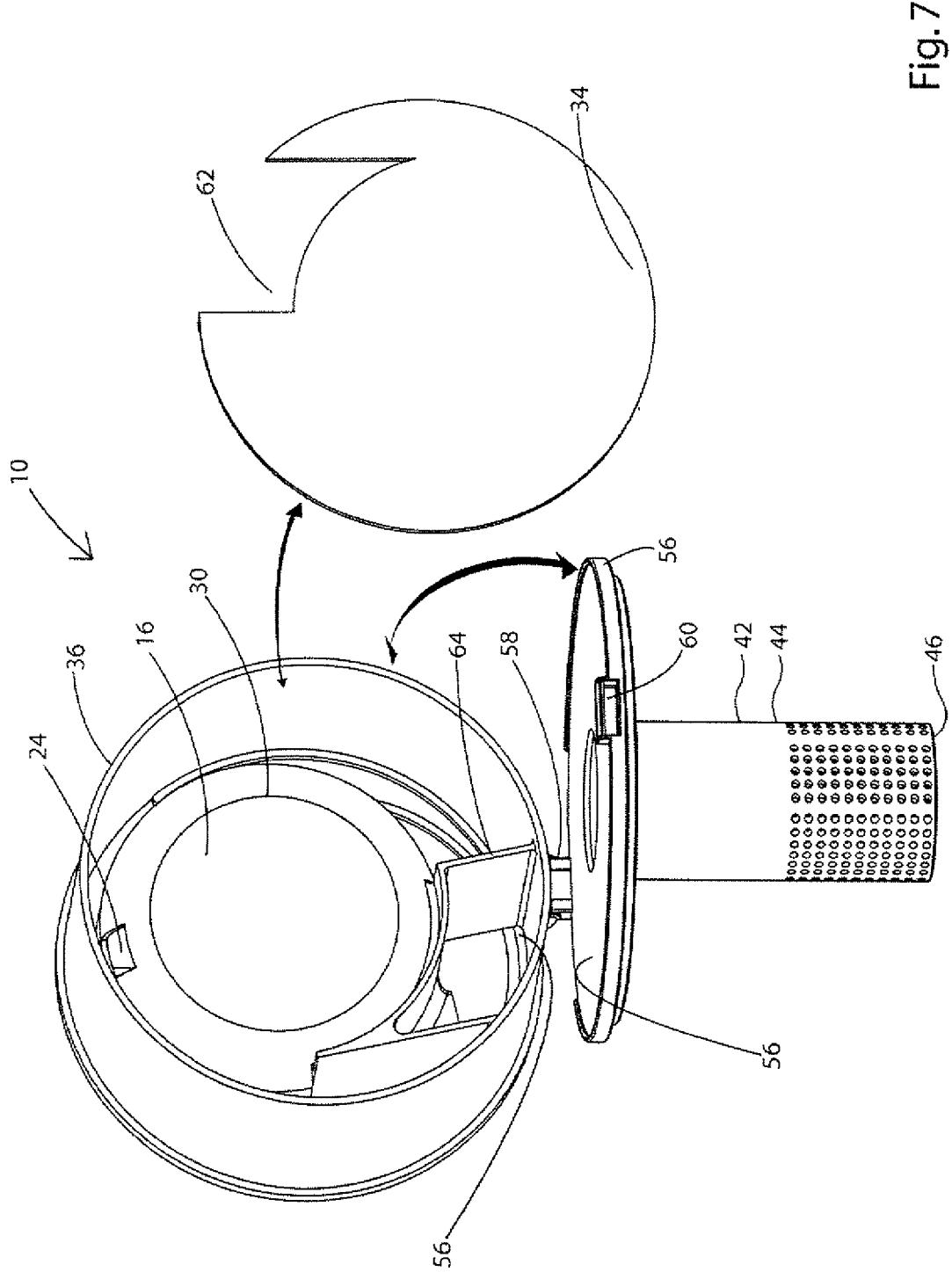
FIG. 7 is an end view of the opened cyclone separator shown in FIG. 6.

In order to permit dirt collection chamber 32 to be emptied, bottom panel 50 may be pivotally attached to cyclone separator assembly 10. For example, flange 58 may be provided on bottom panel 50. A mating flange may be affixed to sidewall 36 (see FIG. 7). The flanges may be pivotally connected by any means known in the art. A latch may be provided on sidewall 36, which engages flange 60, which is provided on bottom panel 50. Accordingly, when in the closed position (shown in FIG. 1), the latch may engage flange 60, thereby securing bottom panel 50 in position. When released, bottom panel 50 may pivot to an open position (as shown in FIG. 7) permitting dirt collected in collection chamber 32 to be emptied. In such a case, a sealing gasket 66 or the like is preferably provided, e.g., mounted to upper surface 52 of panel 50, so as to open with panel 50. Any sealing member known in the art may be used.

Figure 6:
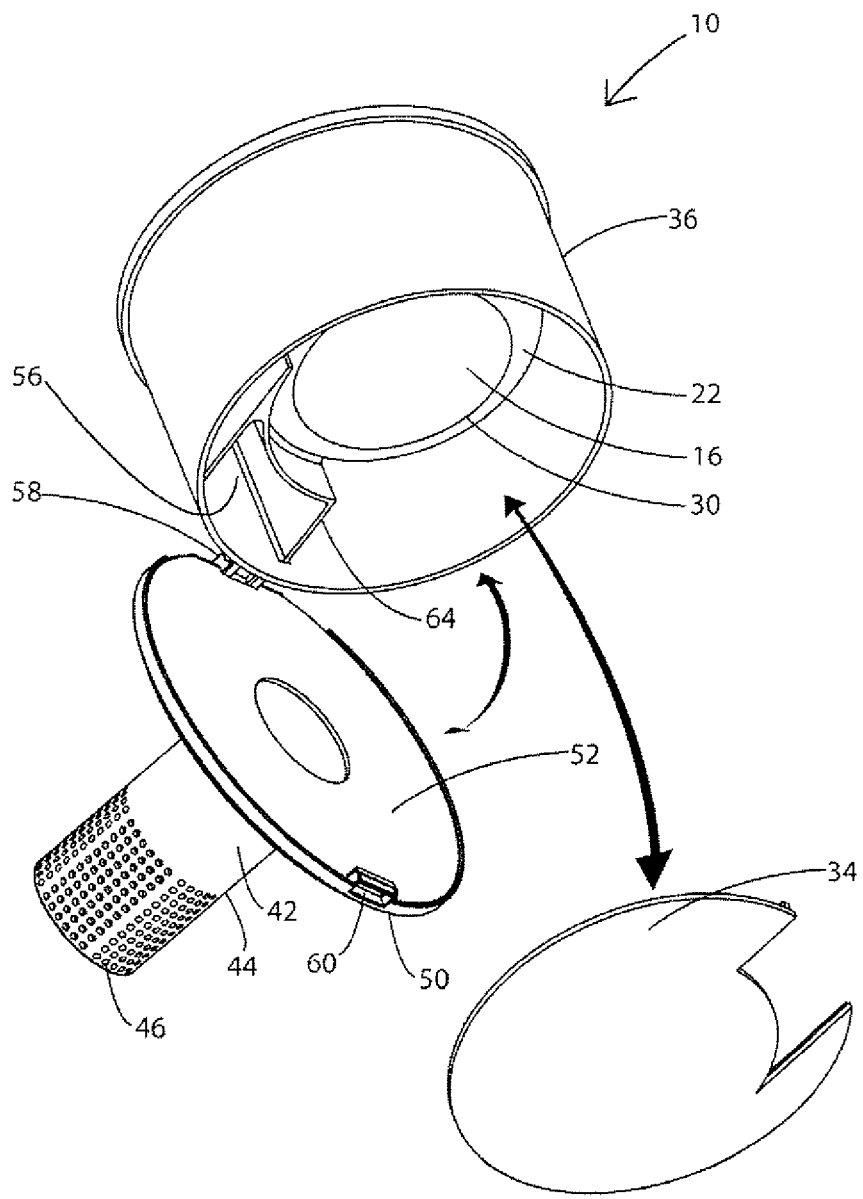
FIG. 6 is a perspective view showing an optional embodiment that permits the cyclone separator to be opened to permit emptying.
Figure 9:
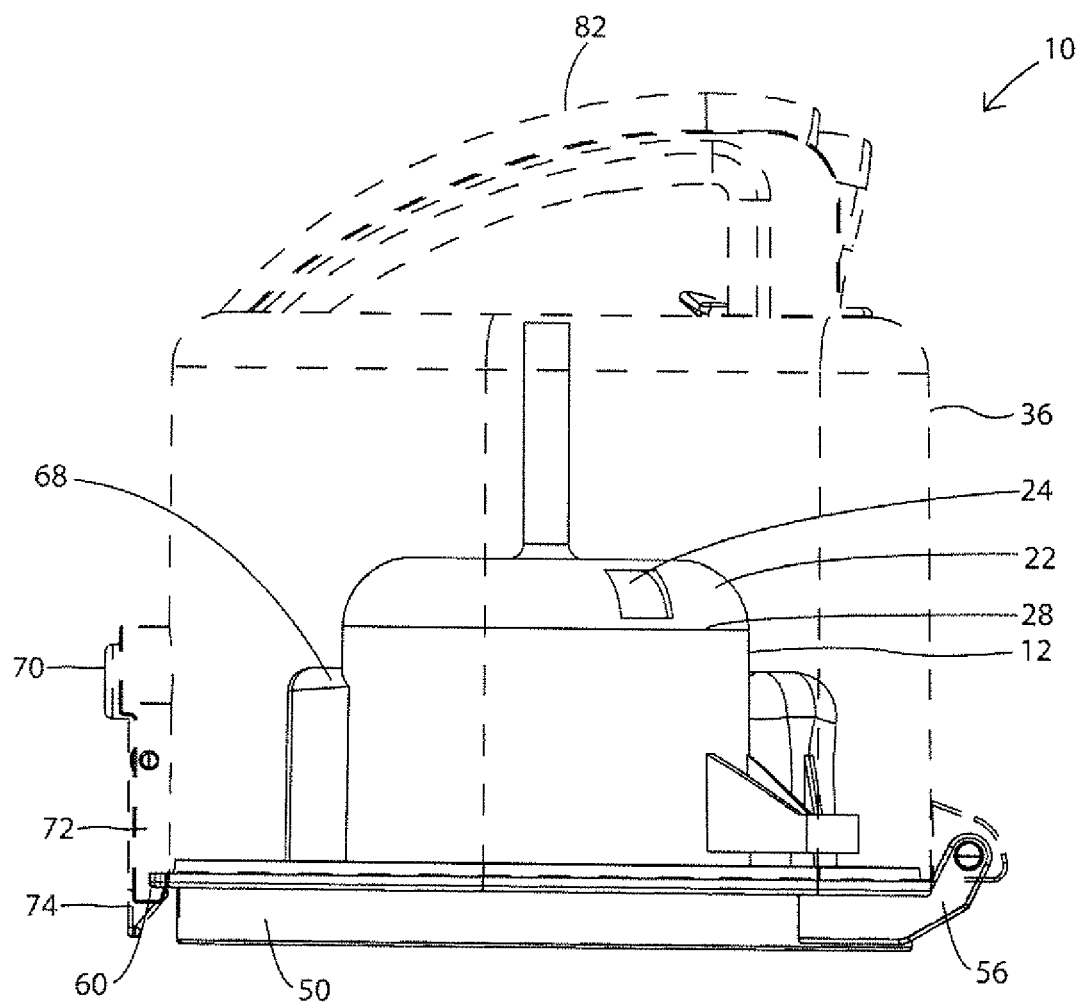
FIG. 9 is a side view of the cyclone separator of FIG. 8 shown encased in a housing.
Figure 10:
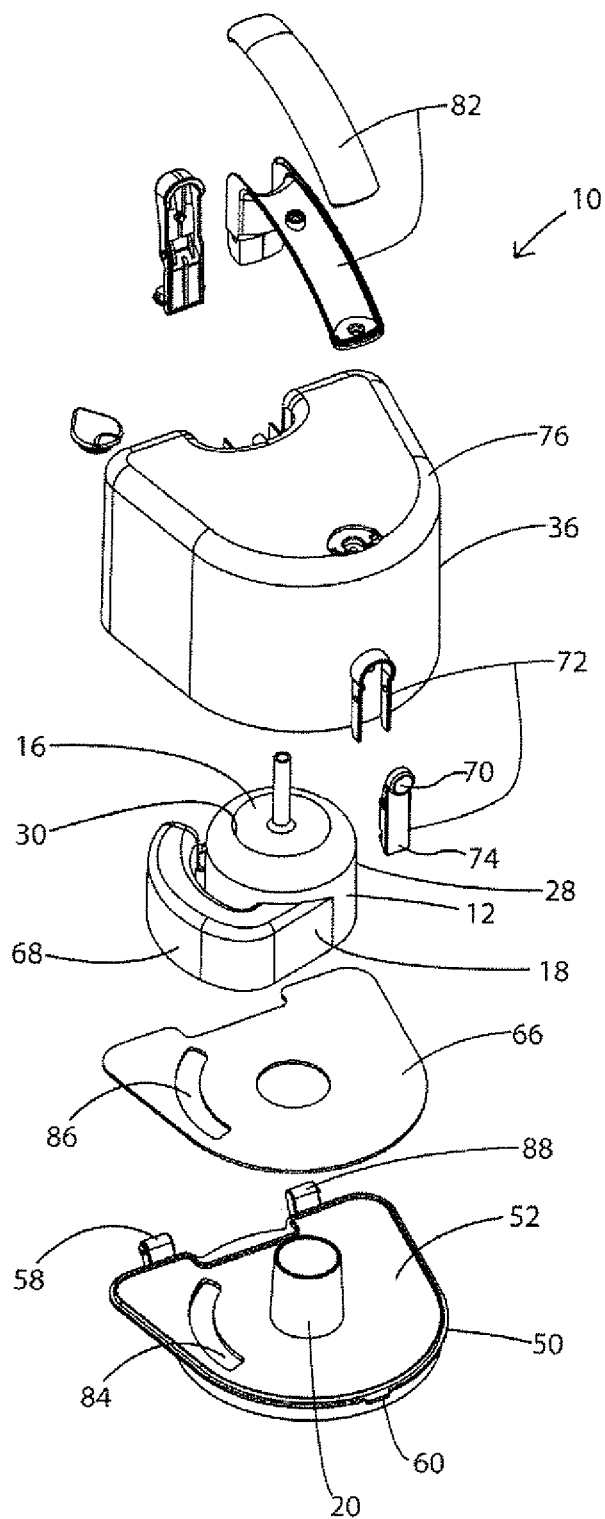
FIG. 10 is an exploded view of the second embodiment of FIG. 8.
Figure 19:
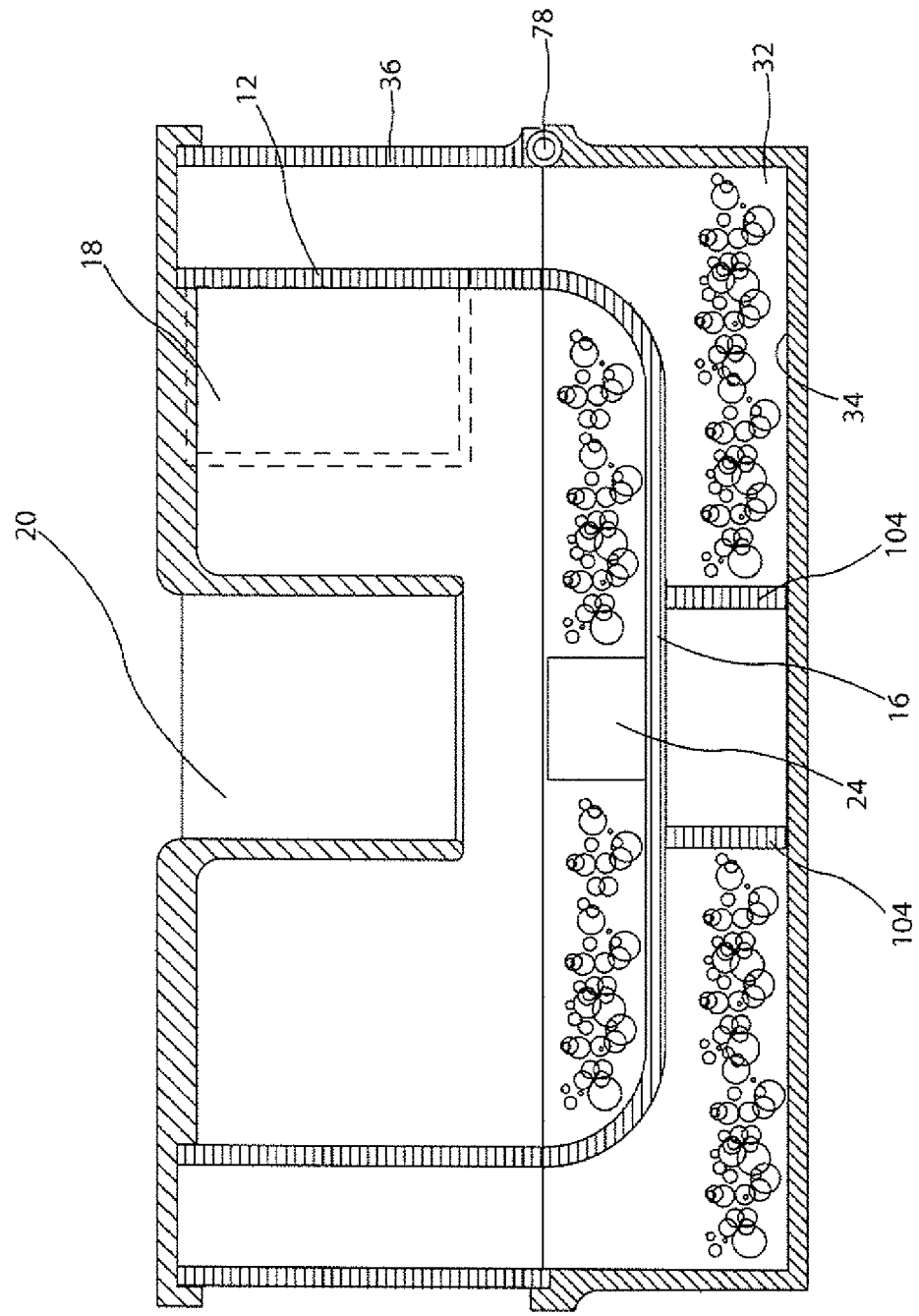
FIG. 19 is a front view of a vertical section of a cyclonic cleaning stage according to a eighth embodiment of this invention wherein the cyclone chamber is openable with the dirt collection chamber, showing the dirt collection chamber and the cyclone chamber in the closed position; and, FIG. 20 is a front view of a vertical section of a cyclonic cleaning stage according to a eighth embodiment of this invention wherein the cyclone chamber is openable with the dirt collection chamber, showing the dirt collection chamber and the cyclone chamber in the open position.
Figure 20:
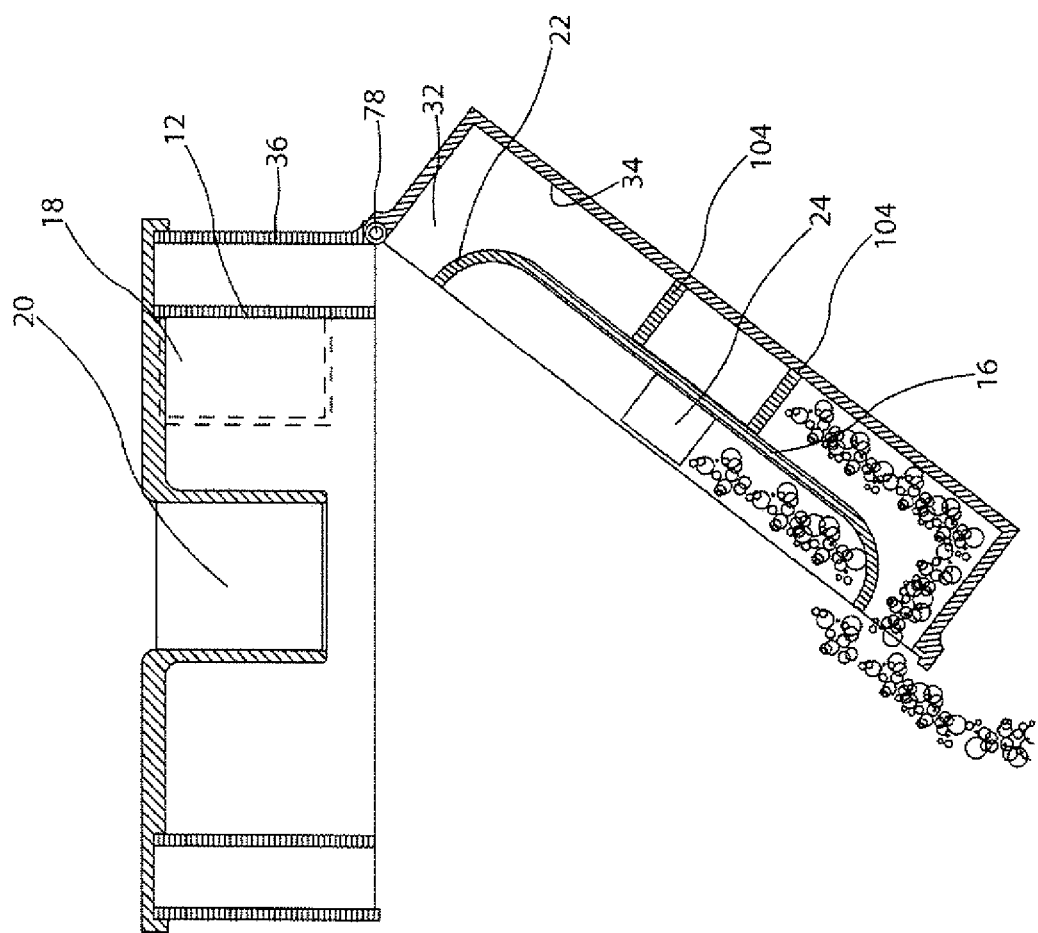

In order to permit dirt collection chamber 32 to be emptied, an opening is provided to access the interior of dirt collection chamber 32. Accordingly, collection surface 34 may be moveably or removable mounted or a door provided to permit access to dirt collection chamber 32. For example, collection surface 34 may be removable, as exemplified in FIG. 6. Alternately, or in addition, collection surface 34 may be pivotally mounted. For example, as exemplified in FIGS. 19 and 20, collection surface 34 is pivotally mounted to sidewall 36 by pivot pin 78. See also for example, the embodiment of FIG. 9.

It will be appreciated that larger particulate matter may be collected in cyclone chamber 26. Accordingly, in any embodiment disclosed herein, access may be provided to the interior of cyclone chamber 26 as well. For example, cyclone chamber 26 may be opened independently of collection chamber 32. Alternatively, cyclone chamber 26 may be opened when dirt collection chamber 32 is opened so that cyclone chamber 26 and collection chamber 32 may be emptied concurrently.

Accordingly, it will be appreciated that it is preferred that cyclone chamber 26 and collection chamber 32 are each openable. For example, lower end 16 and collection surface 34 may be each moveably mounted and may be joined together so that cyclone chamber 26 and collection chamber 32 are concurrently opened. As exemplified in FIGS. 19 and 20, bottom or second end wall 16 of cyclone chamber 26 may be secured or joined to collection surface 34, such as by ribs 104 and constructed to be openable with collection surface 34. The openable portion of each of cyclone chamber 26 and collection chamber 32 may be moveably mounted by any means known in the art. For example, they may be slideably or translatably mounted. Preferably, they are pivotally mounted. Alternately, they may be removably mounted, such as by means of a screw mount, a bayonet mount or securing members such as wing nuts.

As exemplified, cyclone chamber is openable at the juncture of transition member 22 and sidewall 12. Accordingly, when a latch or lock is released, collection surface 34 may be moved to the open position shown in FIG. 20 and accordingly, bottom 16 and transition member 22 are concurrently moved to the open position.

In an alternate embodiment, cyclone chamber 26 may be inverted. In such a case, as exemplified in FIGS. 8-12, collection surface 34 is spaced from opposed surface 33. Collection surface 34 and the first portion of the cyclone casing are openable and, preferably concurrently openable. For example, they may be moveably mounted and connected together. They may be moveably mounted by any means known in the art. For example, they may be slideably or translatably mounted. Preferably, they are pivotally mounted. Alternately, they may be removably mounted, such as by means of a screw mount, a bayonet mount or securing members such as wing nuts. For example, as exemplified in FIGS. 11 and 12, the bottom of the cyclone chamber (when the cyclone chamber is in an inverted orientation) and the collection chamber may both be emptied at the same time by the cyclone chamber and the dirt collection chamber having a bottom panel that are adjacent (e.g., lie in a common plane) and are preferably integrally formed.

It will be appreciated that bottom 16 may be constructed to be opened subsequently to collection chamber 32 (e.g., bottom 16 may not be secured to collection surface 34).

If side air passage 56 is provided, then collection surface 34 may incorporate a cut out 62, which meets, preferably in an airtight manner, with bottom 64 of side air passage 56.

An alternate embodiment is shown in FIGS. 8-12. In this alternate embodiment, the cyclone is inverted. Accordingly, air inlet 18 and air outlet 20 are provided in first end 14, which comprises the lower end of the cyclone separator apparatus 10. Accordingly, in operation, air will enter inlet 18 via, e.g., tangential passage 68. The air will then travel upwardly in a cyclonic fashion in cyclone chamber 26 prior to exiting through outlet 20, which is preferably provided in first end 16. Heavier material (e.g. particulate material) will exit outlet 24 provided, preferably, in transition member 22 and accumulate in the separated material collection chamber 32. If a sealing gasket 66 is optionally provided as exemplified in FIG. 10, then the upper surface of gasket 66 functions as collection surface 34.

Figure 11:
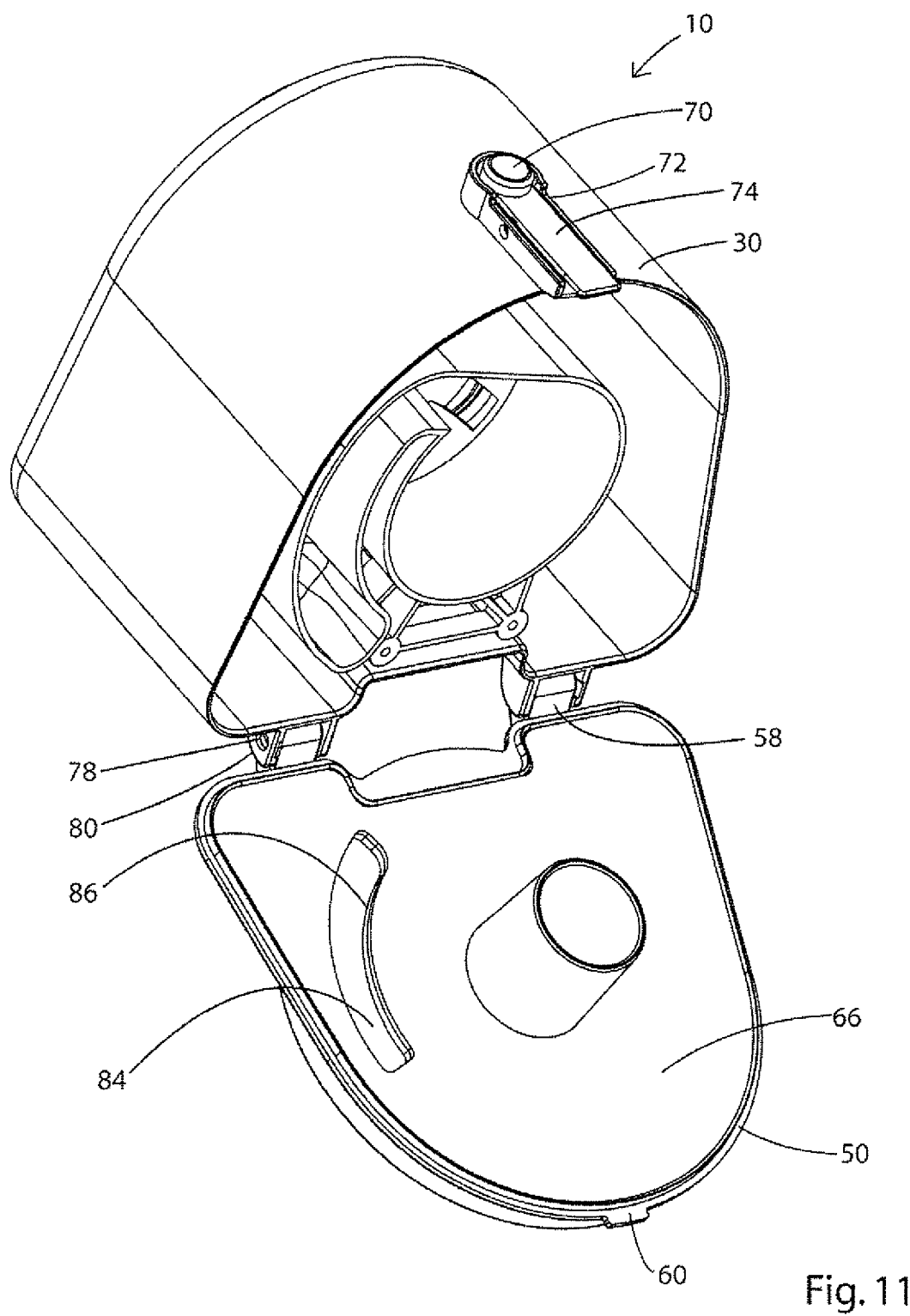
FIG. 11 is a perspective view from below of the cyclone separator of FIG. 8 showing an optional embodiment that permits the cyclone separator to be opened to permit emptying.

In order to empty cyclone separator assembly 10, a latch 72 may be provided. For example, button 70 of latch 72 may be pressed moving arm 74 outwardly thereby disengaging arm 74 from flange 60, thereby permitting bottom panel 50 to pivot downwardly (as shown in FIGS. 11 and 12) to permit the interior cyclone chamber 26 and collection area 22 to be emptied. Bottom panel 50 may be pivotally mounted to sidewall 36 of casing 76 such as by pivot pin 78 extending transversely to connect flange 58 of bottom panel 50 with flange 80 affixed to sidewall 36.

Accordingly, by opening bottom panel 50, preferably over a garbage can or the like, material collected inside cyclone chamber 26 and collection chamber 32 may be emptied. In this embodiment, the collection surface 34 and second end 16 are integrally formed (i.e. they are defined by bottom panel 50). Accordingly, both chambers may be emptied concurrently. In an alternate design they may be separately opened (e.g., if collection surface 34 and second end 16 are separate members).

In a particularly preferred embodiment, cyclone separator apparatus 10 comprises an upper portion of an upright vacuum cleaner. Accordingly, housing 76 may be provided with a handle 82 which may be connected to cyclone separator apparatus 10 by any means known in the art. Air inlet 18 may be in airflow communication with a dirty air inlet or the like of a vacuum cleaner, as a first or subsequent cleaning stage, via opening 84 in panel 50 and opening 86 in optional gasket 66.

Figure 13:
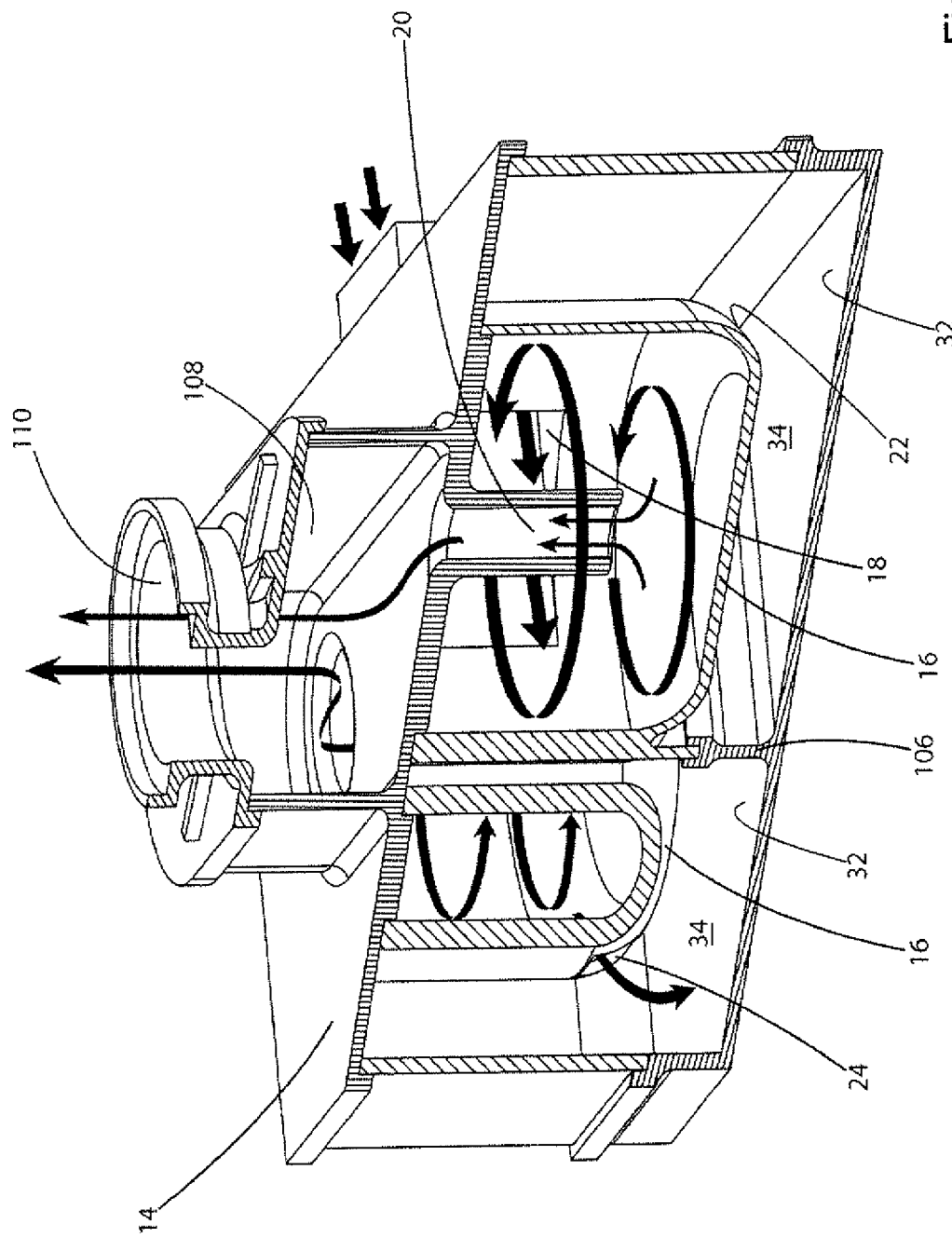
FIG. 13 is a vertical section through a third embodiment of a cyclonic cleaning stage according to this invention wherein a plurality of cyclone separators are connected in parallel.
Figure 14:
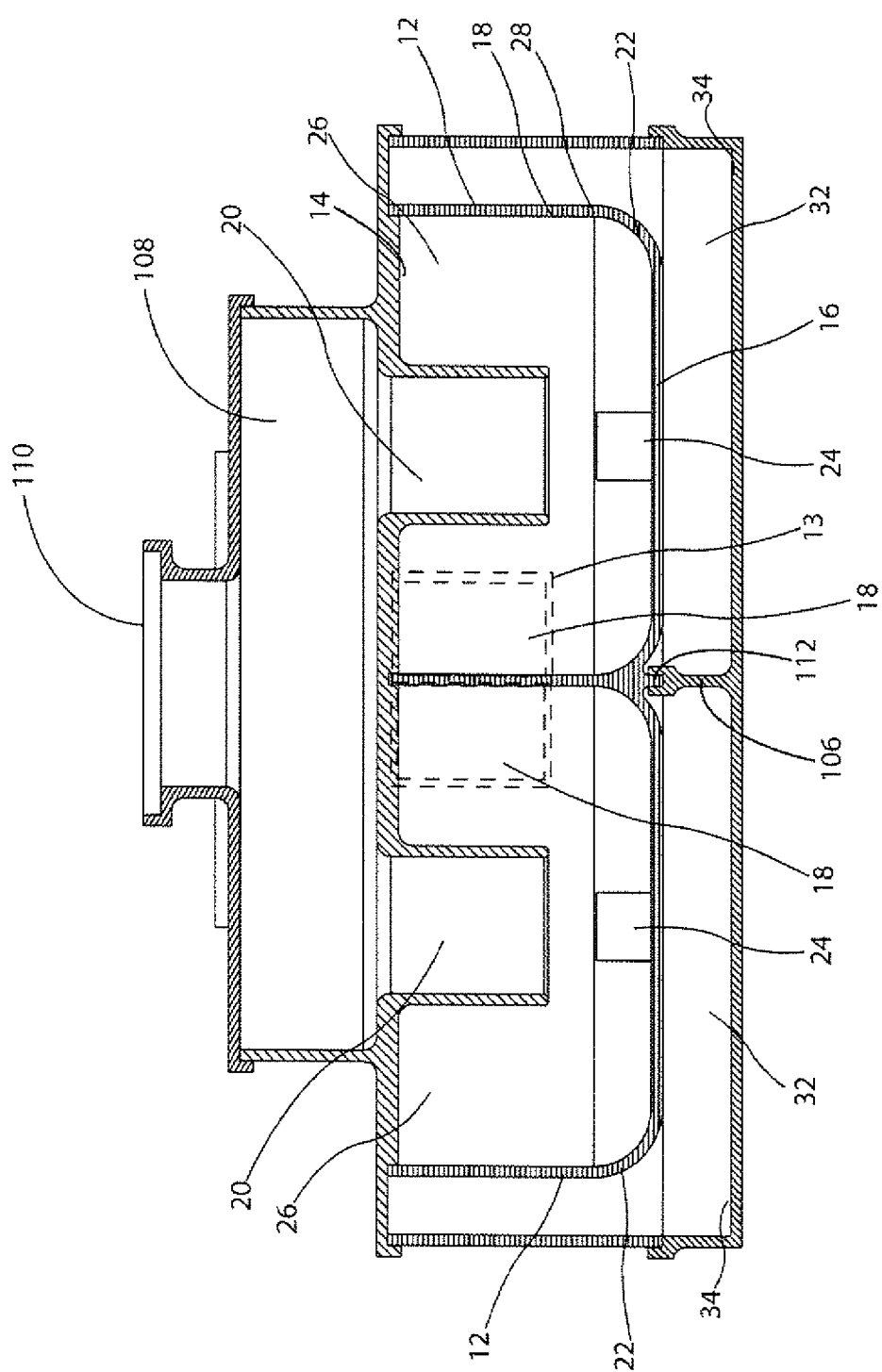
FIG. 14 is a front view of the vertical section of the cyclonic cleaning stage of FIG. 13.
Figure 15:
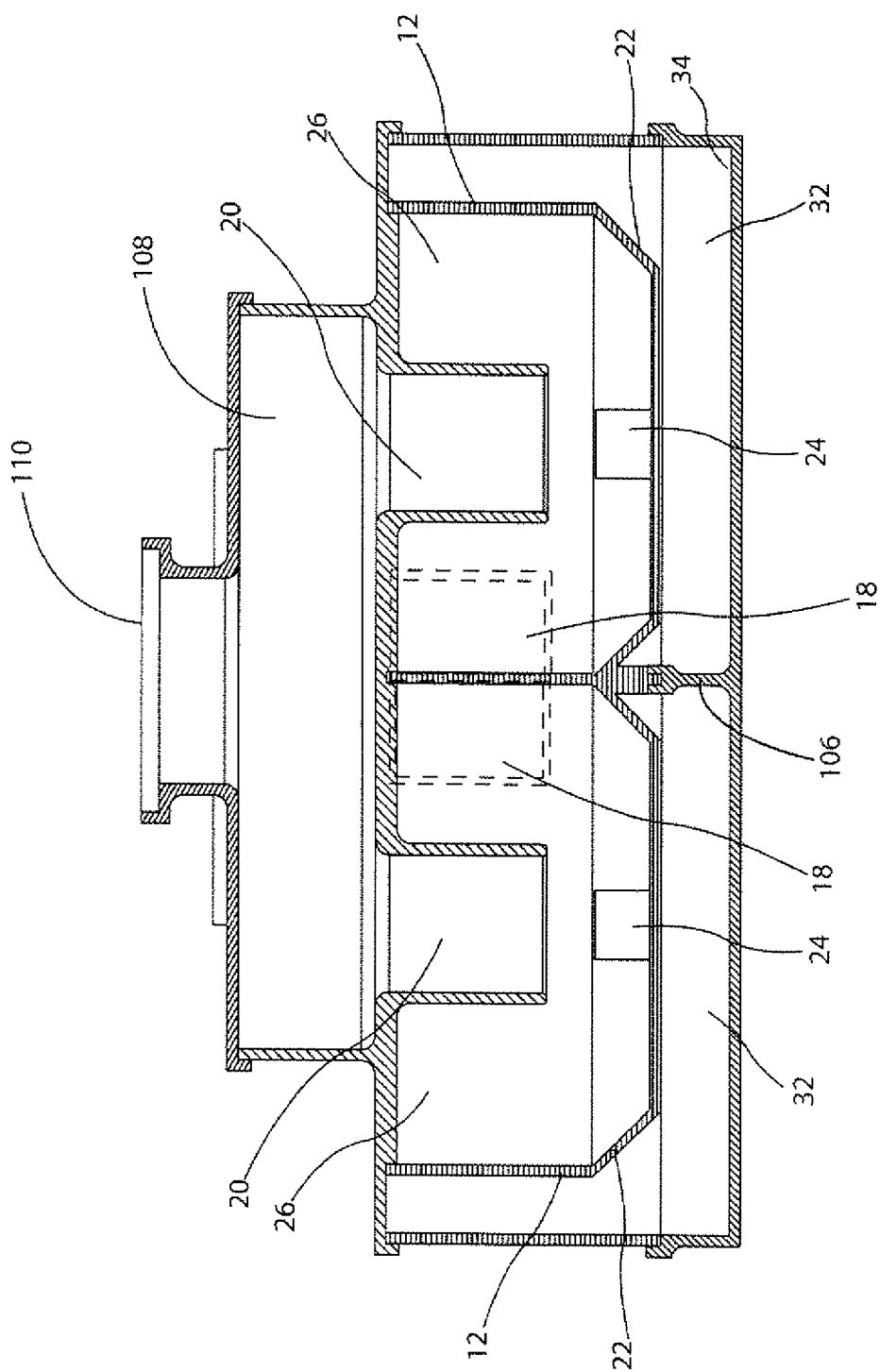
FIG. 15 is a front view of a vertical section of a cyclonic cleaning stage according to a fourth embodiment of this invention wherein the transition member is angled.
Figure 16:
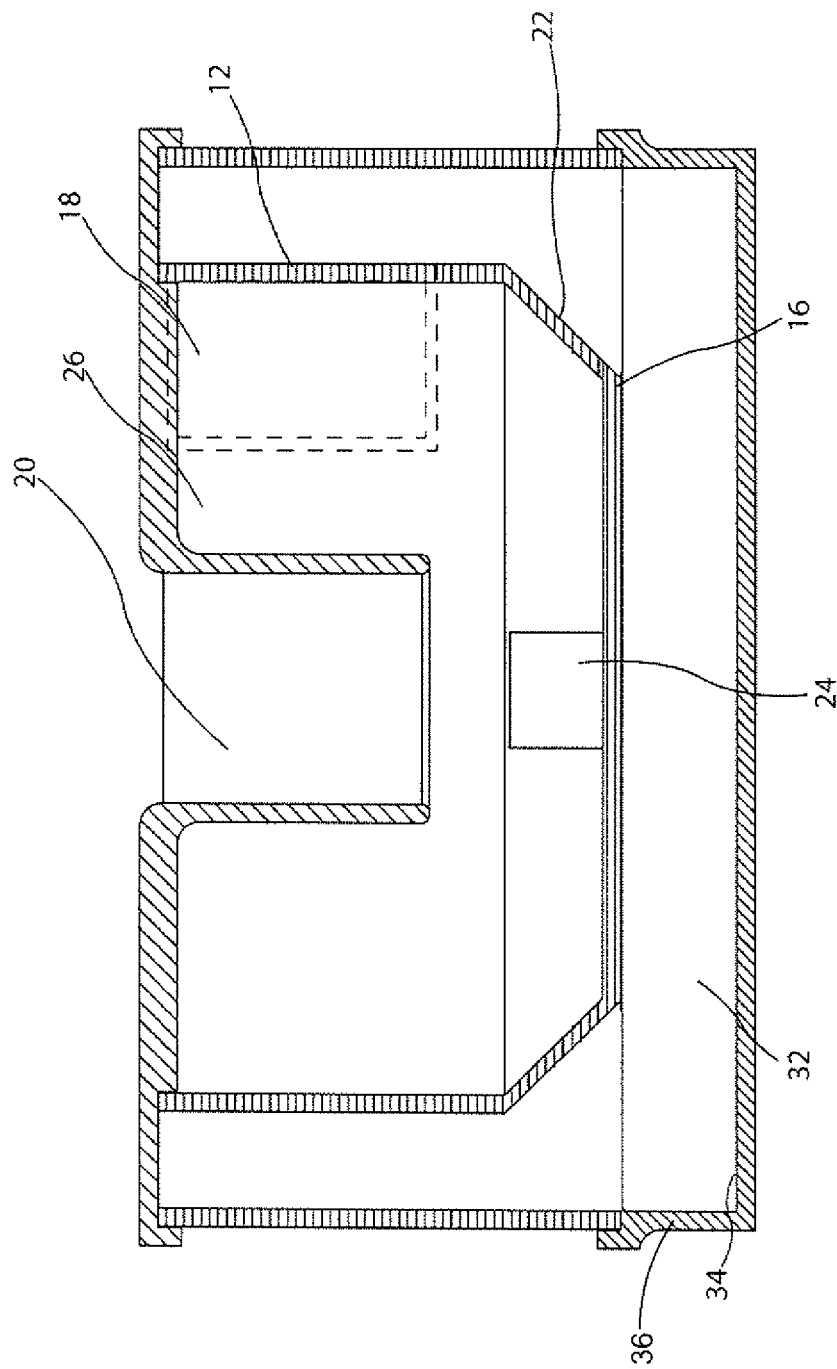
FIG. 16 is a front view of a vertical section of a cyclonic cleaning stage according to a fifth embodiment of this invention wherein the transition member is angled and the cyclonic cleaning stage comprises a single cyclone.

Further alternate embodiments are exemplified in FIGS. 13-15. In these alternate embodiments, a plurality of the cyclone separators 10 is provided. Preferably, the plurality of cyclone separators 10 is provided in parallel. More preferably, the plurality of cyclone separators 10 is provided as a second cleaning stage, more preferably a second cyclonic cleaning stage and most preferably a second cyclonic cleaning stage of parallel cyclones in a surface cleaning apparatus. Any number of cyclone separator apparatus 10 may be provided.

Each cyclone chamber has its own dirt collection chamber 32 that is isolated from the collection chambers 32 of the other cyclone separators 10. For example, as shown, dividing walls 106 separate collection chambers 32. It will be appreciated that, in alternate embodiments, collection chambers 32 need not have common walls. Dividing walls 106 may be secured to extension 112 of sidewall 12 of 16 of cyclone chamber 26 (see for example, FIG. 14) so as to function as a rib 104, such that second end 16 and collection 34 open concurrently. Alternately, dividing walls 106 may be removable from engagement with extension 112 such that collection chamber 32 may be emptied independent of cyclone chamber 26. Cyclone chamber 26 may be separately openable or may not be openable.

As exemplified, outlets 20 of cyclone separators 10 are in airflow communication with a header 108 having, preferably, a single outlet 110. Accordingly, a single flow passage may be provided downstream from the cyclonic cleaning stage exemplified in FIGS. 13-15.

As exemplified, optionally inlets 18 of cyclone separators 10 may be positioned adjacent each other (e.g., side by side). See also FIG. 14. In such a case, collection chamber 32 may surround only the second section, and not the inlet section, of sidewall 12.

It will be appreciated that any of the alternate or optional configurations or features may be used single or in any particular combination or sub-combination with other configurations or features disclosed herein.

It will be appreciated by those skilled in the art that various modifications and additions may be made in each or within the scope of the following claims. In particular, it will be appreciated that one or more cyclones as disclosed herein may be provided in an appliance, preferably in a surface cleaning appliance and, more preferably in a vacuum cleaner. The cyclones may be provided at any orientation and are preferably either inverted or in an upright orientation.

The invention claimed is:

1. A surface cleaning apparatus comprising a cyclone separator assembly, the cyclone separator assembly comprising:

(a) a cyclone casing defining a cyclone chamber having first and second spaced apart opposed ends, a fluid inlet, a fluid outlet, a sidewall and a separated material outlet, the first end including a first end wall of the cyclone chamber, the second end including a second end wall, the sidewall defining a cyclone chamber perimeter, and the cyclone chamber has a cyclone chamber length extending between the first and second end walls, wherein the fluid inlet and the fluid outlet are provided at the first end and the separated material outlet comprises an opening formed in the sidewall at the second end; and, (b) a separated material collection chamber in communication with the separated material outlet and exterior to the cyclone chamber, the separated material collection chamber having a first end including a first end wall, a second spaced apart opposed end having a second end wall and a sidewall extending between the first and second ends of the separated material collection chamber, the separated material collection chamber has a separated material collection chamber length extending between the first and second end walls of the separated material collection chamber wherein the separated material collection chamber length is longer than the cyclone chamber length, wherein one of the end walls of the separated material collection chamber is spaced from and faces one of the end walls of the cyclone chamber and a support member extends therebetween, wherein the sidewall of the cyclone chamber along a first portion of the cyclone chamber perimeter extends continuously from the first end wall to the second end wall and is in contact with the second end wall, and the sidewall of the cyclone chamber along a remainder of the cyclone chamber perimeter has the separated material outlet, wherein a common end of the cyclone chamber and the separated material collection chamber are concurrently openable, and wherein at least a portion of the sidewall of the separated material collection chamber is spaced from and faces the sidewall of the cyclone chamber.

2. The surface cleaning apparatus of claim 1 wherein the common end is a dirt collection surface of the cyclone chamber and the separated material collection chamber.

3. The surface cleaning apparatus of claim 1 wherein the first end of the cyclone chamber is a lower end of the cyclone chamber and the second end of the cyclone chamber is an upper end of the cyclone chamber.

4. The surface cleaning apparatus of claim 3 wherein the sidewall of the separated material collection chamber surrounds a portion of the sidewall of the cyclone chamber that does not have the fluid inlet.

5. The surface cleaning apparatus of claim 4 wherein a first portion of the separated material collection chamber is positioned between the sidewall of the cyclone chamber and the sidewall of the separated material collection chamber and a second portion of the separated material collection chamber is positioned between one of the end walls of the separated material collection chamber and one of the end walls of the cyclone chamber.

6. The surface cleaning apparatus of claim 5 wherein the first portion of the separated material collection chamber is U-shaped.

7. The surface cleaning apparatus of claim 1 wherein in use to clean a floor, the fluid inlet and the fluid outlet are provided at a lower end of the cyclone chamber, the separated material outlet is provided at an upper end of the cyclone chamber and one of the end walls of the separated material collection chamber is spaced from and faces one of the end walls of the cyclone chamber, and wherein a first portion of the separated material collection chamber is positioned between the sidewall of the cyclone chamber and the sidewall of the separated material collection chamber and a second portion of the separated material collection chamber is positioned between the one of the end walls of the separated material collection chamber the one of the end walls of the cyclone chamber.

8. The surface cleaning apparatus of claim 1 wherein the sidewall of the separated material collection chamber surrounds a portion of the sidewall of the cyclone chamber that does not have the fluid inlet.

9. The surface cleaning apparatus of claim 7 wherein the first portion of the separated material collection chamber is U-shaped.

10. The surface cleaning apparatus of claim 1 wherein the first portion of the cyclone chamber perimeter has a first length and the remainder of the cyclone chamber perimeter has a remainder length that is shorter than the first length, and the separated material outlet extends across the remainder length.

11. A surface cleaning apparatus comprising a cyclone separator assembly, the cyclone separator assembly comprising:

(a) a cyclone chamber having a cyclone axis of rotation, a fluid inlet and a fluid outlet provided at a first end wall of a first end of the cyclone chamber, a separated material outlet provided at a second opposed end of the cyclone chamber, which comprises a second opposed end wall of the cyclone chamber and a sidewall, the separated material outlet formed in the sidewall, wherein the second end wall has a cyclone chamber face which faces towards the first end wall and an opposed face and wherein the cyclone chamber has a cyclone chamber length in an axial direction and a cyclone chamber perimeter; and, (b) a separated material collection chamber in communication with the separated material outlet and exterior to the cyclone chamber, the separated material collection chamber having a sidewall extending between first and second opposed end walls of the separated material collection chamber and a separated material collection chamber length in the axial direction wherein the separated material collection chamber length is longer than the cyclone chamber length, wherein one of the end walls of the separated material collection chamber is spaced from and faces one of the end walls of the cyclone chamber and a support member extends therebetween, wherein the sidewall of the cyclone chamber extends along the cyclone chamber perimeter and at least a portion of the sidewall of the cyclone chamber extends from the first end wall to the second end wall and is in contact with the second end wall, wherein a common end of the cyclone chamber and the separated material collection chamber concurrently opens the cyclone chamber and the separated material collection chamber, and wherein at least a portion of the sidewall of the separated material collection chamber is spaced from and faces the sidewall of the cyclone chamber whereby a first portion of the separated material collection chamber is positioned between the sidewall of the cyclone chamber and the sidewall of the separated material collection chamber, and wherein and a second portion of the separated material collection chamber is positioned between an end wall of the separated material collection chamber and the opposed face.

12. The surface cleaning apparatus of claim 11 wherein the common end is a dirt collection surface of the cyclone chamber and the separated material collection chamber.

13. The surface cleaning apparatus of claim 11 wherein the fluid inlet and the fluid outlet are provided at a lower end of the cyclone chamber and the separated material outlet is provided at an upper end of the cyclone chamber.

14. The surface cleaning apparatus of claim 12 wherein the sidewall of the separated material collection chamber surrounds a portion of the sidewall of the cyclone chamber that does not have the fluid inlet.

15. The surface cleaning apparatus of claim 11 wherein the first portion of the separated material collection chamber is U-shaped.

16. The surface cleaning apparatus of claim 11 wherein the sidewall of the separated material collection chamber surrounds a portion of the sidewall of the cyclone chamber that does not have the fluid inlet.

17. The surface cleaning apparatus of claim 16 wherein the first portion of the separated material collection chamber is U-shaped.

18. The surface cleaning apparatus of claim 11 wherein the portion of the sidewall of the cyclone chamber has a first length along the cyclone chamber perimeter and a remaining portion of the sidewall of the cyclone chamber has a remaining length along the cyclone chamber perimeter that is shorter than the first length, and the separated material outlet is formed in the remaining portion of the sidewall of the cyclone chamber and extends across the remaining length.

\* \* \* \* \*